United States Patent
Suzuki

(10) Patent No.: US 7,298,785 B2
(45) Date of Patent: Nov. 20, 2007

(54) MULTICARRIER DEMODULATION METHOD AND APPARATUS, AND MULTICARRIER MODULATION METHOD AND APPARATUS

(75) Inventor: Noriyoshi Suzuki, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 1172 days.

(21) Appl. No.: 10/187,609

(22) Filed: Jul. 3, 2002

(65) Prior Publication Data

US 2003/0043927 A1    Mar. 6, 2003

(30) Foreign Application Priority Data

Jul. 4, 2001 (JP) .............................. 2001-204131
Sep. 27, 2001 (JP) .............................. 2001-298078
Sep. 28, 2001 (JP) .............................. 2001-299050

(51) Int. Cl.
  *H04J 1/00* (2006.01)
  *H04L 27/06* (2006.01)
(52) U.S. Cl. ..................................... 375/260; 375/343
(58) Field of Classification Search ................ 375/143, 375/147, 148, 152, 260, 343; 370/206, 208
See application file for complete search history.

(56) References Cited

U.S. PATENT DOCUMENTS

| | | | |
|---|---|---|---|
| 5,848,107 A | | 12/1998 | Philips |
| 6,724,809 B2 * | | 4/2004 | Reznik ....................... 375/148 |
| 7,023,904 B2 * | | 4/2006 | Shimizu et al. ............. 375/148 |
| 2002/0196842 A1 * | | 12/2002 | Onggosanusi et al. ...... 375/148 |
| 2003/0036359 A1 * | | 2/2003 | Dent et al. ..................... 455/63 |

FOREIGN PATENT DOCUMENTS

| | | |
|---|---|---|
| EP | 0 966 133 | 12/1999 |
| EP | 1 061 687 | 12/2000 |
| EP | 1 150 470 | 10/2001 |
| WO | WO 97/30531 | 8/1997 |

OTHER PUBLICATIONS

Matsumoto, Wataru, et al., "A Study on Half-Symbol Scheme of OFDM Modulation", The 23rd Symposium on Information Theory and Its Applications (SITA2000), Aso, Kumamoto, Japan, Oct. 10-13, 2000, pp. 101-104. Contains Japanese Language with an English Abstract.

* cited by examiner

*Primary Examiner*—Young T. Tse
(74) *Attorney, Agent, or Firm*—Oblon, Spivak, McClelland, Maier & Neustadt, P.C.

(57) ABSTRACT

A method and apparatus for receiving a modulated signal which consists of N subcarriers containing N-L (L<N) nullcarriers and in which an effective symbol has a length T, and a frequency interval between two adjacent subcarriers of the N subcarriers is 1/T. The method includes estimating an excess delay of a delayed wave, and deciding a part of the symbol regarded as a to-be-used symbol, based on the estimated excess delay, where a length of the decided part is TM/N (M<N) within the effective symbol length T which is decided so as not to contain a part of the symbol suffering from a waveform distortion caused by the delayed wave; and decomposing a complex digital signal which is quadrature-detected at sampling intervals T/N into L subcarriers by use of M samples of the signal within the to-be-used symbol part by means of a matched filter.

4 Claims, 15 Drawing Sheets

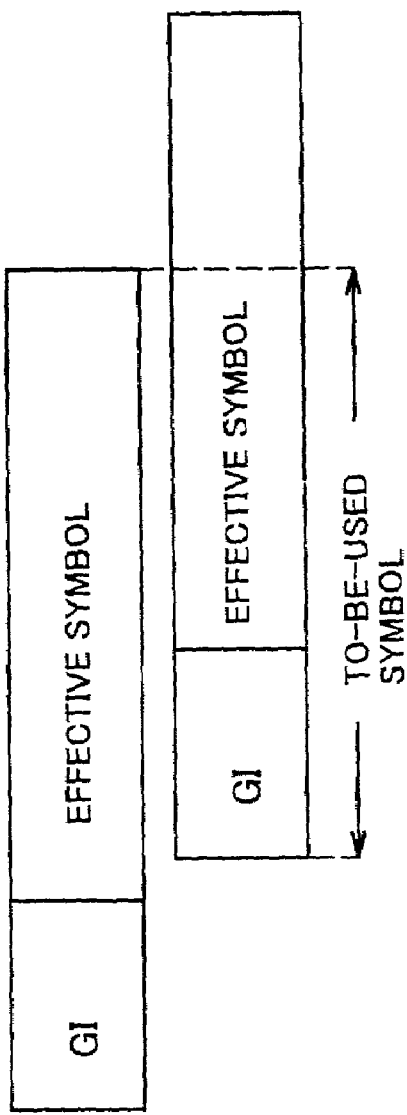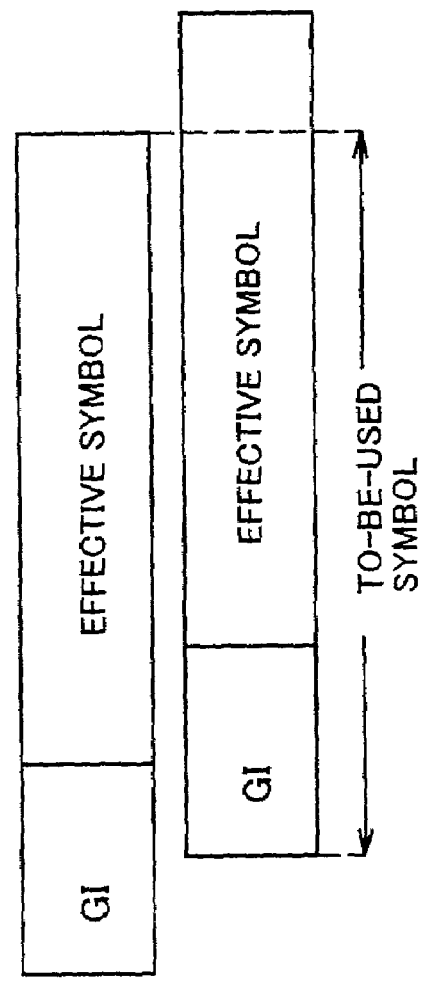
FIG. 9A
FIG. 9B

MULTICARRIER DEMODULATION METHOD AND APPARATUS, AND MULTICARRIER MODULATION METHOD AND APPARATUS

This is a patent application based on Japanese patent application Nos. 2001-204131, 2001-298078, and 2001-299050, which were filed on Jul. 4, 2001, Sep. 27, 2001, and Sep. 28, 2001, respectively, and are incorporated herein by reference.

BACKGROUND OF THE INVENTION

1. Field of the Invention

The present invention relates to a demodulation method and apparatus for a multicarrier transmission scheme in which a plurality of subcarriers are modulated individually and the thus-obtained plurality of modulated signals are transmitted over a single symbol duration T. The present invention is particularly effective for a demodulation apparatus which receives a signal modulated in accordance with, for example, orthogonal frequency division multiplexing (OFDM).

The present invention relates further to a multicarrier demodulation method and apparatus. The present invention is particularly effective for reception of OFDM signals at locations where delayed waves exert considerable influence.

2. Description of the Related Art

For example, in an OFDM scheme in which the frequency interval of N carriers is set to $\Delta f$ (=1/T), where T is the length of a single symbol excepting a guard interval, on the modulation side, N complex digital modulated signals obtained through sampling at sampling intervals of $1/(N\Delta f)$ are generated by means of inverse discrete Fourier transform (IDFT). On the demodulation side, OFDM demodulation is performed through discrete Fourier transform (DFT) by use of N complex digital signals, which are obtained by sampling, at sampling intervals of $1/(N\Delta f)$, a signal from which the guard interval has been removed and which has the single symbol length T. Recently, a technique for reducing the number of sampling points of the received signal used in the above calculation; i.e., halving the single symbol length, has been reported (23rd Symposium on Information Theory and Its Applications, Oct. 2000, pp. 101-104).

Incidentally, on the modulation side, many nullcarriers, which are always zero, are generally contained in inputs (signals to be superposed on subcarriers) of the N-point IDFT (N-point inverse discrete Fourier transform).

For example, in the OFDM modulation scheme, a waveform called a guard interval is added before each effective symbol in order to prevent deterioration of orthogonality that would otherwise occur as a result of superposition of a delayed wave. For example, the last quarter of the effective symbol is added before the effective symbol so as to make a single symbol 5/4 times its original duration. This guard interval prevents the symbol from being influenced by the delayed wave during demodulation if the delay is less than the guard interval duration. At this time, the guard interval is removed by use of a "window" corresponding to the effective symbol duration, and the waveform within the effective symbol duration is used for the demodulation.

However, when a delayed wave having an excess delay longer than the guard interval arrives under the influence of multipaths, the error rate increases greatly. In such a case, the guard interval duration must be increased; however, the increased guard interval duration increases redundancy of communications, thereby lowering communication efficiency.

SUMMARY OF THE INVENTION

In view of the foregoing and in view that use of an N-point DFT is not necessarily required on the demodulation side, the present invention enables a received signal to be decomposed into effective carriers other than nullcarriers without use of all digital complex signals at N sampling points of the received signal within a single symbol duration excepting a guard interval. Moreover, on the transmission side, modulation is performed in such a manner that the single symbol duration (when a guard interval is added to the symbol duration, the guard interval is excluded) is shortened to a degree such that only demodulation of effective carriers other than nullcarriers is possible. On the reception side, demodulation corresponding to the modulation is performed.

In OFDM, even when a band for N carrier is used, the band includes nullcarriers such as guard bands in many cases. In view of this and in view that, in communications using multiple carriers including nullcarriers, a received signal having a shorter symbol duration can be decomposed into effective carriers, another object of the present invention is to provide a demodulation method and apparatus which decompose or demodulate a received signal into effective carriers without using a signal part having a waveform distortion stemming from delayed waves, to thereby prevent the error ratio from increasing greatly even under a multipath environment in which a delayed wave having an excess delay greater than the guard interval arrives at the demodulation side.

A first feature of the present invention is a multicarrier demodulation method for a multicarrier transmission scheme adapted to receive and demodulate a signal consisting of N subcarriers which contain at least N-M (M<N) nullcarriers as subcarriers, comprising: sampling at N sampling points a received signal from which all the N subcarriers can be demodulated, to thereby obtain digital signals; extracting digital signals corresponding to M preset sampling points from the digital signals corresponding to the N sampling points; providing a matrix for demodulating, from the digital signals corresponding to M preset sampling points, to desired L subcarriers ($L \leq M$) among M subcarriers other than the N-M nullcarriers, on the basis of positions on a frequency axis of the M subcarriers other than the N-M nullcarriers and positions on a time axis of the extracted sampling points; and demodulating to the desired L subcarriers among the M subcarriers other than the N-M nullcarriers from a product of the provided matrix and a vector which includes as components the digital signals corresponding to the M sampling points.

The term "nullcarriers" used in the phrase "at least N-M (M<N) nullcarriers as subcarriers" refers to subcarriers which contain no information, such as guard bands and carrier holes. The "N subcarriers" may be subjected to complex modulation or may be modulated in such a manner that only amplitude or phase is modulated. When the N subcarriers are subjected to complex modulation, needless to say, the digital signals corresponding to the N sampling points must be complex signals. In either case, synchronization must be established by use of some means; however, the present invention is not affected by the means for synchronization.

Notably, throughout the specification, the phrase "demodulating subcarriers" may be used to mean "extracting subcarriers" or "separating to subcarriers."

A second feature of the present invention is a multicarrier demodulation method for receiving and demodulating a signal consisting of N subcarriers which contain at least N-M (M<N) nullcarriers as subcarriers, comprising demodulating to desired L subcarriers (L≦M) among M subcarriers other than the N-M nullcarriers, by use of complex digital signals corresponding to M sampling points which are selected from complex digital signals corresponding to N sampling points quadrature-detected at sampling intervals $1/(N\Delta f)$, where $\Delta f$ is a frequency interval between two adjacent subcarriers of the N subcarriers.

The order of quadrature detection and sampling may be determined freely; i.e., analog-digital conversion may be performed after analog quadrature detection; or digital quadrature detection may be performed after analog-digital conversion, both cases being covered by the present invention. The number of points of inverse discrete Fourier transform is not limited to N. Moreover, the M complex digital signals may be those corresponding to the first M points in a single symbol.

A modification in relation to the second feature of the present invention is a multicarrier demodulation method for receiving and demodulating a signal which has been modulated by use of inverse discrete Fourier transform and which consists of N subcarriers containing at least N-M (M<N) nullcarriers as subcarriers, comprising: sampling a signal obtained through analog quadrature detection at M sampling points having a time interval $\delta/(N\Delta f)$ ($0<\delta<1$) in order to obtain complex digital signals corresponding to the M sampling points, where $\Delta f$ is a frequency interval between two adjacent subcarriers of the N subcarriers; and demodulating to desired L subcarriers (L≦M) among M subcarriers other than the N-M nullcarriers, by use of the complex digital signals corresponding to the M sampling points.

Another modification in relation to the second feature of the present invention is a multicarrier demodulation method for receiving and demodulating a signal which has been modulated by use of inverse discrete Fourier transform and which consists of N subcarriers containing at least N-M (M<N) nullcarriers as subcarriers, comprising: quadrature detection and sampling a received signal at time intervals $1/(vN\Delta f)$ (v is an integer not less than 2) in order to obtain M complex digital signals, where $\Delta f$ is a frequency interval between two adjacent subcarriers of the N subcarriers; and demodulating to desired L subcarriers (L≦M) among M subcarriers other than the N-M nullcarriers, by use of the M complex digital signals. In this case, the order of quadrature detection and sampling may be determined freely; i.e., analog-digital conversion may be performed after analog quadrature detection; and digital quadrature detection may be performed after analog-digital conversion, which are both covered by this modification of the invention. Notably, the above-described complex digital signals are generally base band signals.

Third and fourth features of the present invention are multicarrier demodulation apparatuses which employ the multicarrier demodulation methods according to the first and second features of the present invention. The descriptions of the terms used in claims similarly apply. The present invention also provides multicarrier demodulation apparatuses according to modifications of the fourth feature which respectively employ the multicarrier demodulation methods according to the above-described two modifications of the second feature.

A fifth feature of the present invention is a multicarrier modulation method for transmitting, by use of inverse discrete Fourier transform, a signal consisting of N subcarriers which contain at least N-M (M<N) nullcarriers as subcarriers, comprising partially removing a part of each symbol which does not contain a corresponding guard interval, in order to shorten the length of the symbol from $1/\Delta f$ to $M/(N\Delta f)$, where $\Delta f$ is a frequency interval between two adjacent subcarriers of the N subcarriers. In the present invention, since a part of each symbol which does not contain a corresponding guard interval is removed partially, a signal having a length $M/(N\Delta f)$ is naturally a part of a signal having a length $1/\Delta f$, so that entire data are not transmitted within a shortened period of time. The number of points of the inverse discrete Fourier transform at the transmission side is not limited to N, which is the number of sampling points at the reception side.

In the fifth feature, the desired L subcarriers (L≦M) among M subcarriers other than the N-M nullcarriers may be demodulated from complex digital signals corresponding to M sampling points quadrature-detected at sampling intervals $1/(N\Delta f)$, where $\Delta f$ is a frequency interval between two adjacent subcarriers of the N subcarriers. In the present invention as well, the order of quadrature detection and sampling may be determined freely; i.e., analog-digital conversion may be performed after analog quadrature detection; and digital quadrature detection may be performed after analog-digital conversion, which are both covered by the present invention.

A modification in relation to the fifth feature of the present invention is characterized by comprising sampling a signal obtained through analog quadrature detection at M sampling points having a time interval $\delta/(N\Delta f)$ ($0<\delta<1$) in order to obtain complex digital signals corresponding to the M sampling points, where $\Delta f$ is a frequency interval between two adjacent subcarriers of the N subcarriers; and demodulating to desired L subcarriers (L≦M) among M subcarriers other than the N-M nullcarriers, by use of the complex digital signals corresponding to the M sampling points. Notably, the above-described complex digital signals are generally base band signals.

Another modification in relation to the fifth feature of the present invention is characterized by comprising: quadrature detection and sampling a received signal at time intervals $1/(vN\Delta f)$ (v is an integer not less than 2) in order to obtain M complex digital signals, where $\Delta f$ is a frequency interval between two adjacent subcarriers of the N subcarriers; and demodulating to desired L subcarriers (L≦M) among M subcarriers other than the N-M nullcarriers, by use of the M complex digital signals. In this case as well, the order of quadrature detection and sampling may be determined freely; i.e., analog-digital conversion may be performed after analog quadrature detection; or digital quadrature detection may be performed after analog-digital conversion, both cases being covered by this modification of the invention.

A sixth feature of the present invention resides in a multicarrier modulation apparatus which employs the multicarrier modulation method according to the fifth feature of the present invention as well as a multicarrier demodulation apparatus which employs the multicarrier demodulation method according to the fifth feature of the present invention. The descriptions of the terms used in claims similarly apply. The present invention also provides multicarrier demodulation apparatuses which respectively employ the multicarrier demodulation methods according to the two above-described modifications of the fifth feature.

A seventh feature of the present invention is a multicarrier demodulation method for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for separating and demodulating the received signal to respective subcarriers, the method comprising: estimating an excess delay of a delayed wave, and determining, on the basis of the estimated excess delay, a part having a length TM/N (L≦M<N) and serving as a to-be-used symbol, the part being determined from the effective symbol length T in such a manner that the part does not contain a part having a waveform distortion caused by the delayed wave; and separating and demodulating to L subcarriers by use of signals corresponding to M sampling points within the to-be-used symbol part, which are selected from complex digital signals obtained through quadrature detection performed at sampling intervals T/N. In this case as well, the above-described complex digital signals are generally base band signals. In the following features as well, demodulated digital signals are generally base band signals.

An eighth feature of the present invention is a multicarrier demodulation method for receiving a multicarrier modulated signal which consists of N subcarriers containing N-L (L<N) nullcarriers as subcarriers and in which an effective symbol has a length T, a guard interval added before the effective symbol has a length $T_{GI}$, and a frequency interval between two adjacent subcarriers of the N subcarriers is 1/T, and for separating and demodulating the received signal to respective subcarriers, the method comprising: estimating an excess delay of a delayed wave, and determining, on the basis of the estimated excess delay, a part having a length TM'/N (L≦M'<N+($NT_{GI}$/T)) and serving as a to-be-used symbol, the part being determined from the sum T+$T_{GI}$ of the effective symbol length and the guard interval length in such a manner that the part does not contain a part having a waveform distortion caused by the delayed wave; and separating and demodulating L subcarriers by use of signals corresponding to M' sampling points within the to-be-used symbol part, which are selected from complex digital signals quadrature-detected at sampling intervals T/N.

A ninth feature of the present invention is a multicarrier demodulation method for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for separating and demodulating the received signal to respective subcarriers, the method comprising: a step of estimating an excess delay of a delayed wave, and determining, on the basis of the estimated excess delay, a part having a length TM/N (M<N) and serving as a to-be-used symbol, the part being determined from the effective symbol length T in such a manner that the part does not contain a part having a waveform distortion caused by the delayed wave; a step of separating L subcarriers by means of a matched filter and by use of signals corresponding to M sampling points within the to-be-used symbol part, which are selected from complex digital signals quadrature-detected at sampling intervals T/N; and one or a plurality of interference component removal steps of deciding L symbols tentatively from signals of the L subcarriers, obtaining, from the L tentative symbol decisions, an interference component contained in each of the signals of the L subcarriers separated by means of the matched filter, the interference component being generated due to interference with other subcarriers, and subtracting the interference components of the L subcarriers from the L subcarriers separated by means of the matched filter, to thereby obtain more reliable signals of the L subcarriers.

A tenth feature of the present invention is a multicarrier demodulation method for receiving a multicarrier modulated signal which consists of N subcarriers containing N-L (L<N) nullcarriers as subcarriers and in which an effective symbol has a length T, a guard interval added before the effective symbol has a length $T_{GI}$, and a frequency interval between two adjacent subcarriers of the N subcarriers is 1/T, and for separating and demodulating the received signal to respective subcarriers, the method comprising: a step of estimating an excess delay of a delayed wave, and determining, on the basis of the estimated excess delay, a part having a length TM'/N (M'<N+($NT_{GI}$/T)) and serving as a to-be-used symbol, the part being determined from the sum T+$T_{GI}$ of the effective symbol length and the guard interval length in such a manner that the part does not contain a part having a waveform distortion caused by the delayed wave; a step of separating L subcarriers by means of a matched filter and by use of signals corresponding to M' sampling points within the to-be-used symbol part, which are selected from complex digital signals quadrature-detected at sampling intervals T/N; and one or a plurality of interference component removal steps of deciding L symbols tentatively from signals of the L subcarriers, obtaining, from the L tentative symbol decisions, an interference component contained in each of the signals of the L subcarriers separated by means of the matched filter, the interference component being generated due to interference with other subcarriers, and subtracting the interference components of the L subcarriers from the L subcarriers separated by means of the matched filter, to thereby obtain more reliable signals of the L subcarriers.

An eleventh feature of the present invention is a multicarrier demodulation apparatus for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for separating and demodulating the received signal to respective subcarriers, the apparatus comprising: an quadrature detection and sampling section for obtaining N samples of a complex digital signal quadrature-detected at sampling intervals T/N; an excess delay estimation section for estimating an excess delay of a delayed wave; a to-be-used symbol extraction section for extracting, on the basis of the excess delay estimated by the excess-delay estimation section, M (L≦M<N) samples of the complex digital signal as a to-be-used symbol from the N samples of the complex digital signal so as not to contain a part having a waveform distortion caused by the delayed wave; a matrix computation section for calculating an L-by-M complex matrix, which is a linear operating expression for separating and demodulating to L subcarriers by use of the M samples of the complex digital signal output from the to-be-used symbol extraction section; and a linear operation section for multiplying the L-by-M complex matrix obtained by the matrix computation section by a column vector consisting of the M samples of the complex digital signal and a length M, to thereby separate and demodulate to the L subcarriers.

A twelfth feature of the present invention is a multicarrier demodulation apparatus for receiving a multicarrier modulated signal which consists of N subcarriers containing N-L (L<N) nullcarriers as subcarriers and in which an effective symbol has a length T, a guard interval added before the effective symbol has a length $T_{GI}$, and a frequency interval between two adjacent subcarriers of the N subcarriers is 1/T, and for separating and demodulating the received signal to respective subcarriers, the apparatus comprising: a quadrature detection and sampling section for obtaining $N+(NT_{GI}/T)$ samples of a complex digital signal quadrature-detected at sampling intervals T/N; an excess delay estimation section for estimating an excess delay of a delayed wave; a to-be-used symbol extraction section for extracting, on the basis of the excess delay estimated by the excess delay estimation section, M' ($L \leq M' < N+(NT_{GI}/T)$) samples of the complex digital signal as a to-be-used symbol from the $N+(NT_{GI}/T)$ samples of the complex digital signas so as not to contain a part having a waveform distortion caused by the delayed wave; a matrix computation section for calculating an L-by-M' complex matrix, which is a linear operating expression for separating and demodulating L subcarriers by use of the M' samples of the complex digital signal output from the to-be-used symbol extraction section; and a linear operation section for multiplying the L-by-M' complex matrix obtained by the matrix computation section by a column vector consisting of the M' samples of the complex digital signal and a length M', to thereby separate and demodulate to the L subcarriers.

A thirteenth feature of the present invention is a multicarrier demodulation apparatus for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for separating and demodulating the received signal to respective subcarriers, the apparatus comprising: an quadrature detection and sampling section for obtaining N samples of a complex digital signal quadrature-detected at sampling intervals T/N; an excess delay estimation section for estimating an excess delay of a delayed wave; a to-be-used symbol extraction section for extracting, on the basis of the excess delay estimated by the excess delay estimation section, M (M<N) samples of the complex digital signal as a to-be-used symbol from the N samples of the complex digital signals so as not to contain a part having a waveform distortion caused by the delayed wave; a matched filter section for separating L subcarriers by means of a matched filter and by use of the M samples of the complex digital signal output from the to-be-used symbol extraction section; and one or a plurality of interference component removal sections each including a tentative symbol decision unit for deciding L symbols tentatively from signals of the L subcarriers, an interference component estimation unit for obtaining, from the L tentative symbol decisions, an interference component contained in each of the signals of the L subcarriers separated by means of the matched filter section, the interference component being generated due to interference with other subcarriers, and an interference component subtractor for subtracting the interference components of the L subcarriers from the signals of the L subcarriers output from the matched filter section.

A fourteenth feature of the present invention is a multicarrier demodulation apparatus for receiving a multicarrier modulated signal which consists of N subcarriers containing N-L (L<N) nullcarriers as subcarriers and in which an effective symbol has a length T, a guard interval added before the effective symbol has a length $T_{GI}$, and a frequency interval between two adjacent subcarriers of the N subcarriers is 1/T, and for separating and demodulating the received signal to respective subcarriers, the apparatus comprising: an quadrature detection and sampling section for obtaining $N+(NT_{GI}/T)$ samples of a complex digital signal quadrature-detected at sampling intervals T/N; an excess delay estimation section for estimating an excess delay of a delayed wave; a to-be-used symbol extraction section for extracting, on the basis of the excess delay estimated by the excess delay estimation section, M' ($M' < N+(NT_{GI}/T)$) samples of the complex digital signal as a to-be-used symbol from the $N+(NT_{GI}/T)$ samples of the complex digital signal so as not to contain a part having a waveform distortion caused by the delayed wave; a matched filter section for separating L subcarriers by means of a matched filter and by use of the M' samples of the complex digital signal output from the to-be-used symbol extraction section; and one or a plurality of interference component removal sections each including a tentative symbol decision unit for deciding L symbols tentatively from signals of the L subcarriers, an interference component estimation unit for obtaining, from L tentative symbol decisions, an interference component contained in each of the signals of the L subcarriers separated by means of the matched filter section, the interference component being generated due to interference with other subcarriers, and an interference component subtractor for subtracting the interference components of the L subcarriers from the signals of the L subcarriers output from the matched filter section.

A fifteenth feature of the present invention is a multicarrier demodulation method for a multicarrier transmission scheme adapted to receive and demodulate a multicarrier modulated signal which has L subcarriers allocated at different arbitrary frequencies ($f_1, f_2, f_3, \ldots, f_L$ ($f_i < f_{i+1}$)) and whose transmission symbol length is T, the method comprising: sampling a received signal at different arbitrary M sampling times ($t_1, t_2, t_3, \ldots, t_M$ ($0 \leq t_m < t_{m+1} < T$)) within a period corresponding to the symbol length T to thereby obtain M samples of the signal; preparing an L-by-M matrix for demodulating to L subcarriers; and separating the L subcarriers by use of the product of the L-by-M matrix and a column vector consisting of the M samples of the signal.

A sixteenth feature of the present invention is a multicarrier demodulation method for a multicarrier transmission scheme adapted to receive and demodulate an OFDM modulated signal which has L subcarriers whose inter-subcarrier frequency interval is an integer multiple of $\Delta f$ and in which a transmission symbol length T is given by $T_{GI}+T_E$, where $T_{GI}$ is a guard interval length, $T_E$ is an effective symbol length, and $0 \leq T_{GI}$, the method comprising: sampling a received signal at sampling intervals $\Delta T=1/(N\Delta f)$, where L<N, and N is not necessarily an integer, in order to obtain samples of the signal within a period corresponding to the symbol length T, the number of the samples of the signal being not greater than $T/\Delta T$ ($=N+(T_{GI}/\Delta T)$); preparing an L-by-M matrix for demodulating to L subcarriers by use of M arbitrary samples of the signal within the thus obtained samples of the signal, where $L \leq M < N+(T_{GI}/\Delta T)$, and M is an integer; and demodulating to the L subcarriers by use of the product of the L-by-M matrix and a column vector consisting of the M samples of the signal.

A seventeenth feature of the present invention is a multicarrier demodulation method for a multicarrier transmission scheme adapted to receive and demodulate a multicarrier modulated signal which has L subcarriers allocated at different arbitrary frequencies ($f_1, f_2, f_3, \ldots, f_L$ ($f_i < f_{i+1}$)) and whose transmission symbol length is T, the method comprising: a step of sampling a received signal at M different arbitrary sampling times ($t_1, t_2, t_3, \ldots, t_M$ ($0 \leq t_m < t_{m+1} < T$)) within a period corresponding to the symbol length T to thereby obtain M samples of the signal, and inputting the M samples of the signal to L matched filters matched to the L subcarriers within a period corresponding to the M sampling points to thereby separate the L subcarriers; and one or a plurality of interference component removal steps of deciding L symbols tentatively from signals of the L subcarriers, obtaining, from the L tentative symbol decisions, an interference component contained in each of the signals of the L subcarriers separated by means of the matched filters, the interference component being generated due to interference with other subcarriers, and subtracting the interference components of the L subcarriers from the L subcarriers separated by means of the matched filters, to thereby obtain more reliable signals of the L subcarriers.

An eighteenth feature of the present invention is a multicarrier demodulation method for a multicarrier transmission scheme adapted to receive and demodulate an OFDM modulated signal which has L subcarriers whose inter-subcarrier subcarrier frequency interval is an integer multiple of $\Delta f$ and in which a transmission symbol length T is given by $T_{GI+TE}$, where $T_{GI}$ is a guard interval length, $T_E$ is an effective symbol length, and $0 \leq T_{GI}$, the method comprising: a step of sampling a received signal at sampling intervals $\Delta T=1/(N\Delta f)$, where L<N, and N is not necessarily an integer, in order to obtain samples of the signal within a period corresponding to the symbol length T, the number of the samples of the signal being not greater than $T/\Delta T$ (=$N+(T_{GI}/\Delta T)$), estimating an excess delay of a delayed wave, determining on the basis of the estimated excess delay a part serving as a to-be-used symbol of a length $M\Delta T$ in such a manner that the part does not contain a part having a waveform distortion caused by the delayed wave, inputting M samples of the signal obtained from the to-be-used symbol part to L matched filters matched to the L subcarriers corresponding to the length of the to-be-used symbol, to thereby separate the L subcarriers; and one or a plurality of interference component removal steps of deciding L symbols tentatively from signals of the L subcarriers, obtaining, from the L tentative symbol decisions, an interference component contained in each of the signals of the L subcarriers separated by means of the matched filters, the interference component being generated due to interference with other subcarriers, and subtracting the interference components of the L subcarriers from the L subcarriers separated by means of the matched filters, to thereby obtain more reliable signals of the L subcarriers.

The multicarrier demodulation method and apparatus according to the first through fourth features are based on the finding that although data of N subcarriers including nullcarriers are conventionally demodulated by use of a complex signal corresponding to N sampling points, when at least N-M (M<N) subcarriers are nullcarriers (e.g., guard bands and carrier holes which do not contain any information), the remaining M subcarriers can be demodulated by use of a complex signal corresponding to M sampling points (M<N) under a certain restriction. Naturally, desired L (L<M) subcarriers among the M subcarriers can be demodulated by use of a complex signal corresponding to M sampling points (M<N) under a certain restriction. Moreover, even when M-L carriers among the M subcarriers are nullcarriers, the desired L (L<M) subcarriers can be demodulated by use of a complex signal corresponding to M sampling points (M<N) under a certain restriction. Measures and restrictions which enable the above demodulation will be described later. Thus, each of the M subcarriers containing all effective carriers can be demodulated without use of the first N-M samples of the signal among the signal corresponding to N sampling points, but by use of the signal corresponding to the remaining M sampling points. In other words, demodulation can be performed at higher speed as compared with demodulation from the signal corresponding to the N sampling points.

In particular, the multicarrier demodulation method and apparatus according to the first through fourth features are effective when used to receive a signal modulated by use of inverse discrete Fourier transform, such as OFDM-type signals. This is because signals modulated by use of inverse discrete Fourier transform, such as OFDM-type modulated signals, are typical in terms of design method. That is, it is possible to easily obtain a matrix (linear computation) for demodulation from M samples of a complex signal on the basis of the carrier numbers; i.e., positions on the frequency axis, of subcarriers which are not nullcarriers and the sampling numbers; i.e., positions on the time axis, of M points used for computation (the second and fourth features). When the M points selected from the N points of a single symbol are the first M points of a single symbol, demodulation can be performed at the highest speed (a modification of the second and fourth features).

Moreover, when digital sampling is performed after obtainment of a base band signal by means of analog quadrature detection, the sampling intervals can be made more narrow than $1/(N\Delta f)$, where $\Delta f$ is the frequency intervals of the subcarriers, whereby the demodulation speed is increased further. When the sampling intervals is set to a value obtained by dividing $1/(N\Delta f)$ by an integer, the order of quadrature detection and sampling can be determined freely.

The modulation method and apparatus according to the fifth and sixth features premise that the demodulation side does not require a single symbol length. That is, the number of samples of a complex signal which constitute a part having a single symbol length (when a guard band is added, the guard band is excluded) is reduced from N to M, the single symbol length (when a guard band is added, the guard band is excluded) can be shortened from $1/\Delta f$ to $M/(N\Delta f)$, whereby high speed, high density communications can be realized.

The modifications of the fifth and sixth features are directed to a demodulation method and a demodulation apparatus which demodulate carriers modulated by the modulation method and apparatus according to the fifth and sixth features and which correspond to the demodulation method and apparatus according to the fifth and sixth features. In addition to the effects of the modulation method and apparatus according to the fifth and sixth features, the effects of the second and fourth features can be attained.

Next, the seventh to eighteenth features of the present invention will be described.

L effective carriers among N subcarriers having undergone OFDM modulation (L<N) can be demodulated if a pseudo inverse matrix to be described later exists. At this time, at least L sampling points are required. Therefore, N sampling points are not necessarily required. Thus, even when a delayed wave having an excess delay greater than the guard interval has arrived, L effective carriers (L<N) can be demodulated by use of, for example, M sampling points ($L \leq M \leq N$) counted from the end of the effective symbol, if waveform distortion on account of the excess delay does not affect the M sampling points. That is, influences of the waveform distortion caused by the delayed wave can be removed before the effective carriers are separated and demodulated. However, this is an ideal case, because in practice the subcarriers are affected by noise. Thus, there can be realized a demodulation method and apparatus whose error rate does not increase greatly even when a delayed wave having an excess delay greater than the guard interval arrives (the seventh, eighth, eleventh, and twelfth features). Moreover, when only delayed waves each having an excess delay less than the guard interval arrive, influences of noise can be suppressed through employment of sampling points which are greater in number than the N sampling points of the effective symbol (the eighth and twelfth features).

Moreover, influences of interference caused by delayed waves can be suppressed more effectively through applying one or plurality of interference-component removal steps, as follows. After influences of waveform distortion caused by a delayed wave are removed in the same manner as described above, M samples for separating effective carriers are extracted. In this case, L and M are not necessarily required to satisfy $L \leq M$, and the interference-component removal step(s) can be performed even when M<L. Subsequently, L subcarriers are separated by means of matched filters in such a manner that influences of noise are minimized. Subsequently, inter-carrier interference components of the signals of the L subcarriers separated by means of the matched filters are removed gradually, as follows. First, L symbols are tentatively decided from the L subcarriers separated by means of the matched filters. At this time, characteristics of the propagation channel are considered. Next, from the L tentative symbol decisions, the inter-carrier interference components contained in the L subcarrier signals are calculated in consideration of the characteristics of the propagation channel and the M-point symbol part to be used. When the inter-carrier interference components are subtracted from the signals of the L subcarriers separated by means of the matched filters, more accurate signals of the L subcarriers can be obtained.

The second and subsequent interference-component removal steps are performed as follows. In consideration of the characteristics of the propagation channel, L symbols are tentatively decided from the signals of the L subcarriers obtained in the preceding stage and having higher accuracy. Next, from the L tentative symbol decisions, the inter-carrier interference components contained in the L subcarrier signals are calculated in consideration of the characteristics of the propagation channel and the M-point symbol part to be used. When the inter-carrier interference components are subtracted from the signals of the L subcarriers separated by means of the matched filters, more accurate signals of the L subcarriers can be obtained (the ninth, tenth, thirteenth, and fourteenth features).

The fifteenth feature is a generalization of the above-described feature. Specifically, the fifteenth feature enables demodulation by use of a matrix in the case in which the number of subcarriers and arrangement of the subcarriers on the frequency axis are determined arbitrarily, and the number of sampling points and arrangement of the sampling point on the time axis are determined arbitrarily. The sixteenth feature enables demodulation of a received signal by use of a matrix in the case in which subcarriers and sampling points are arranged at equal intervals.

The seventeenth and eighteenth features enable removal of interference waves by use of matched filters.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIG. 9 is a set of conceptual diagrams showing operations of the multicarrier demodulation apparatus 100, wherein (a) shows operation for the case of arrival of a delayed wave having an excess delay greater than a guard interval, and (b) shows operation for the case of arrival of a delayed wave having an excess delay not greater than the guard interval;

DETAILED DESCRIPTION OF THE PREFERRED EMBODIMENTS

Figure 1:
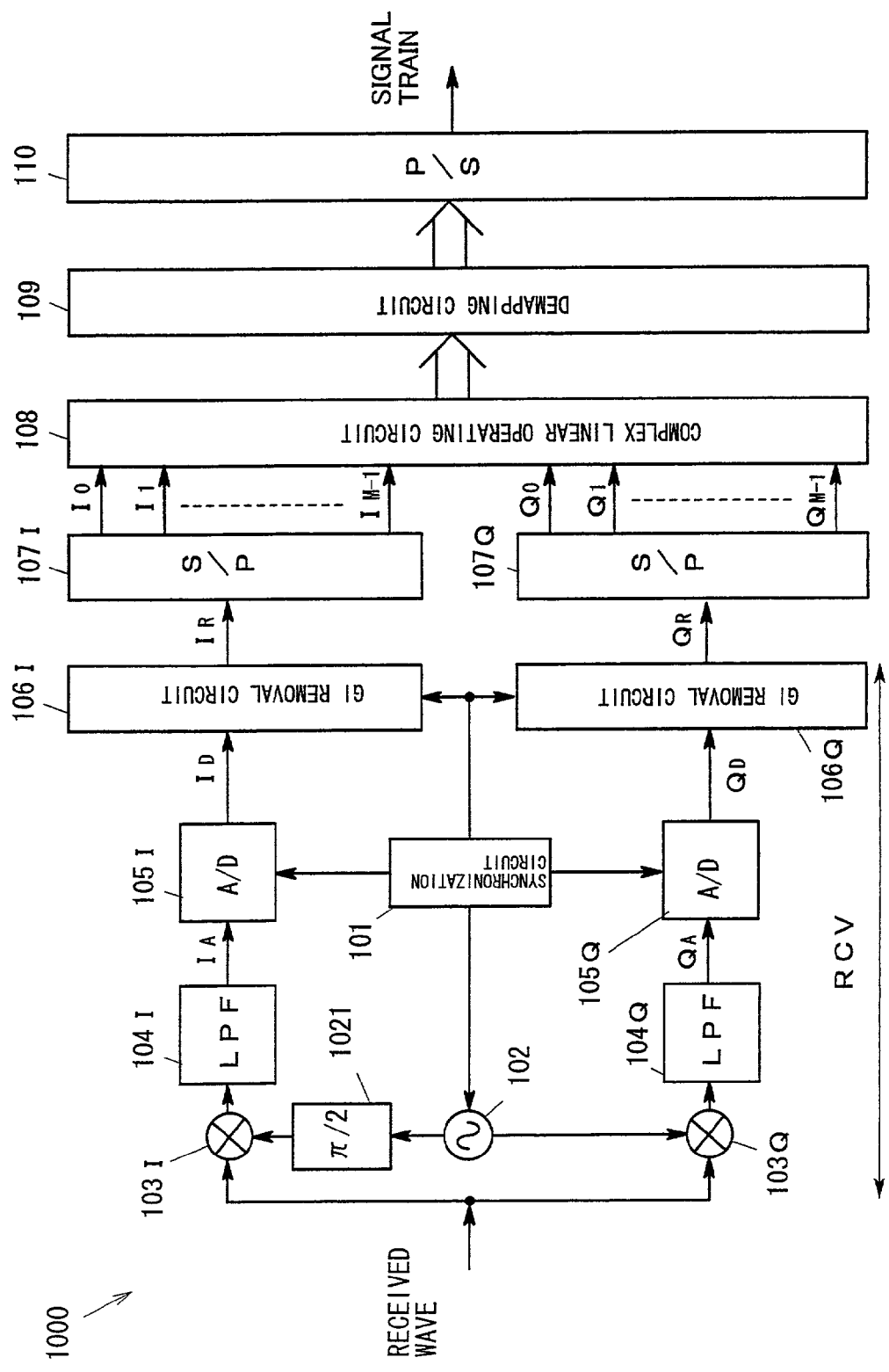
FIG. 1 is a block diagram showing the configuration of a multicarrier demodulation apparatus according to a first embodiment of the present invention.

The present invention will next be described in detail with reference to embodiments, which should not be construed as limiting the invention thereto.

It is to be noted that the modes described in the summary of the invention section are also preferred modes of the present invention. First, preferred modes in relation to the first to sixth features of the present invention will be described.

Carrier number and sampling point number which enable implementation of the present invention will now be described, while OFDM is taken as an example. Notably, as will be described later, the present invention is not limited to OFDM. The purpose of the following description is to confirm that the rank of an M-by-M matrix extracted from an N-by-N matrix representing an N-point inverse discrete Fourier transform is M (i.e., to confirm that an inverse matrix is present), without use of direct calculation such as diagonalization.

[Regarding Carrier Number and Sample Point Number Which Enable Implementation of the Present Invention]

First, an OFDM-type carrier; i.e., a carrier whose waveform satisfies the following Expression (1) at the nth point (n is zero or an integer up to N−1), will be considered.

$$x(n) = \frac{1}{N}\sum_{k=0}^{N-1} X(k)W_N^{-kn} \quad (1)$$

where $$W_N = \exp\left(-\frac{2\pi j}{N}\right),$$

j is the imaginary unit.

Here, for the case in which carriers do not use all numbers (k=0 to −1), a condition is sought under which M carriers containing all effective symbol carriers can be demodulated by use of M sampling points among N-sampling points corresponding to n=0 to N−1. This condition is expressed as follows.

$$x(n_q) = \frac{1}{N}\sum X(k_p)\exp\left(2\pi j k_p \frac{n_q}{N}\right) \quad (2)$$

In Expression (2), Σ is applied to a set $\{k_p\}$ consisting of M integers. A set $\{n_q\}$ consists of M integers. Here, it is assumed that $1 \leq p, q \leq M$; $0 \leq k_p, n_q \leq N-1$; $k_p < k_{p+1}$; and $n_q < n_{q+1}$. Expression (2) shows that a vector consisting of M complex numbers $x(n_q)$ is the product of a matrix whose element in the qth row and the pth column is $\exp(2\pi j k_p n_q/N)$ and a vector consisting of M complex numbers $X(k_p)$. Therefore, the question of whether the vector consisting of M complex numbers $X(k_p)$ can be obtained from the vector consisting of M complex numbers $x(n_q)$ is equivalent to the question of whether the matrix whose element in the qth row and the pth column is $\exp(2\pi j k_p n_q/N)$ has an inverse matrix.

Regarding a matrix whose element in the qth row and the pth column is $\exp(2\pi j k_p n_q/N)$, when each of the sets $\{k_p\}$ and $\{n_q\}$ is a set consisting of N integers of not less than 0 but not greater than N−1Expression (1) holds. The inverse matrix is an N-by-N matrix whose element in the (k+1)th row and the (n+1)th column is $W_N^{kn}$, where $W_N=\exp(-2\pi j/N)$; $0 \leq k \leq N-1$; $0 \leq n \leq N-1$; the relation corresponding to that between IDFT (N-point inverse discrete Fourier transform) and DFT (N-point discrete Fourier transform). Meanwhile, a considerably wide range of methods can be used to select sets $\{k_p\}$ and $\{n_q\}$ each consisting of M mutually different integers not less than 0 but not greater than N−1, so as to meet the condition that the matrix whose element in the qth row and the pth column is $\exp(2\pi j k_p n_q/N)$ has an inverse matrix. However, in the following manner, one can judge whether or not sets $\{k_p\}$ and $\{n_q\}$ render the matrix whose element in the qth row and the pth column is $\exp(2\pi j k_p n_q/N)$ not to have an inverse matrix; i.e., one can make the sets $\{k_p\}$ and $\{n_q\}$ satisfy the requirement that the matrix whose element in the qth row and the pth column is $\exp(2\pi j k_p n_q/N)$ has an inverse matrix.

[Presence/Absence of Inverse Matrix]

The question of whether the M-by-M matrix whose element in the qth row and the pth column is $\exp(2\pi j k_p n_q/N)$ (sets $\{k_p\}$ and $\{n_q\}$ each consisting of M integers satisfy the conditions $1 \leq p, q \leq M$; $0 \leq k_p, n_q \leq N-1$; $k_p < k_{p+1}$; and $n_q < n_{q+1}$) has an inverse matrix (whether the determinant is non-zero) is equivalent to the question of whether the determinant of the matrix having been subjected to the following conversion is zero. Specifically, focusing on the q'th row and the p'th column, all elements are divided by $\exp(2\pi j k_{p'} n_{q'}/N)$, the pth column (p≠p') is divided by $\exp(2\pi j (k_p - k_{p'}) n_{q'}/N)$, and the qth column (q≠q') is divided by $\exp(2\pi j k_{p'}(n_q - n_{q'})/N)$. Through these division operations, all the elements in the q'th row and the p'th column can be made 1. Here, for rows, a divisor b of N (N=ab) is obtained, and a residue system (the number of element is represented by B) of $\{n_q\}$ which has the largest number of elements, among b-based residue systems, is selected. For columns, all components of the first column are set to 1. All components of one row, among rows corresponding to the residue system of $\{n_q\}$ selected by use of the above-mentioned b, are set to 1.

A specific example thereof will be described. It is assumed that N=12, the element in the qth row and the pth column is $\exp(\pi j k_p n_q/6)$, $\{k_p\}=\{0, 1, 4, 5, 8\}$, and $\{n_q\}=\{0, 1, 2, 3, 6\}$. Residue systems of $\{n_q\}$ when b=3 (i.e., a=4) are $\{0, 3, 6\}$, $\{1\}$, and $\{2\}$, and among these the residue system $\{0, 3, 6\}$ has the largest number of elements. The matrix is expressed as follows.

$$\begin{pmatrix} 1 & 1 & 1 & 1 & 1 \\ 1 & \exp\left(\frac{\pi j}{6}\right) & \exp\left(\frac{2\pi j}{3}\right) & \exp\left(\frac{5\pi j}{6}\right) & \exp\left(\frac{4\pi j}{3}\right) \\ 1 & \exp\left(\frac{\pi j}{3}\right) & \exp\left(\frac{4\pi j}{3}\right) & \exp\left(\frac{5\pi j}{6}\right) & \exp\left(\frac{2\pi j}{3}\right) \\ 1 & \exp\left(\frac{\pi j}{2}\right) & 1 & \exp\left(\frac{\pi j}{2}\right) & 1 \\ 1 & \exp(\pi j) & 1 & \exp(\pi j) & 1 \end{pmatrix} \quad (3)$$

In the matrix of Expression (3), all the components of the first column are 1; as are all the elements of the first row corresponding to $n_q=0$, among rows corresponding to the residue system $\{n_q\}=\{0, 1, 2, 3, 6\}$, which has the largest number of elements among the residue systems obtained when b=3.

The question of whether the determinant is zero is not affected by exchange of rows or exchange of columns. Now, the rows corresponding to the residue system which has the largest number of elements among the b-based residue systems are exchanged with the first through Bth rows. Further, all the components of the first column (p=1) and all the components of the first row (q=1) are set to 1. In the matrix of Expression 3, the rows corresponding to $\{0, 3, 6\}$ are exchanged with the first to third (i.e., B=3) rows, so that the following matrix is obtained.

$$\begin{pmatrix} 1 & 1 & 1 & 1 & 1 \\ 1 & \exp\left(\frac{\pi j}{2}\right) & 1 & \exp\left(\frac{\pi j}{2}\right) & 1 \\ 1 & \exp(\pi j) & 1 & \exp(\pi j) & 1 \\ 1 & \exp\left(\frac{\pi j}{6}\right) & \exp\left(\frac{2\pi j}{3}\right) & \exp\left(\frac{5\pi j}{6}\right) & \exp\left(\frac{4\pi j}{3}\right) \\ 1 & \exp\left(\frac{\pi j}{3}\right) & \exp\left(\frac{4\pi j}{3}\right) & \exp\left(\frac{5\pi j}{3}\right) & \exp\left(\frac{2\pi j}{3}\right) \end{pmatrix} \quad (4)$$

The work up to this point is realized through processing of obtaining residue systems of the set $\{n_q\}$ of integers by use of a divisor b of N; exchanging rows corresponding to a residue system which has the largest number of elements (the number is represented by B) with the first through Bth rows; dividing all elements by $\exp(2\pi j k_1 n_1/N)$; dividing the pth column (p≠1) by $\exp(2\pi j (k_p - k_1) n_1/N)$, and dividing the qth column (q≠1) by $\exp(2\pi j k_1 (n_q - n_1)/N)$. These are so-called elementary transformations of matrices, and such transformations have no effect on the question of whether the determinant of a matrix is zero.

When the number of types of a-based residue systems of the column $\{k_p\}$ is represented by A, the number of possible arrangements of the components in each of the first through Bth rows is A. In actuality, in the matrix of Expression (3), the number of types of residue systems of $\{k_p\}=\{0, 1, 4, 5, 8\}$ obtained for a=4 is 2 (i.e., A=2); i.e., $\{0, 4, 8\}$ and $\{1, 5\}$. In Expression 4 transformed from Expression 3 (the transformation does not relate to whether the determinant is zero), the number of types of patterns of components in the first to third rows is only two; i.e., the first, third, and fifth columns have one type of pattern, and the second and fourth columns have another type of pattern.

The above consideration clearly shows the following.

[1] In the case where A<B, when a matrix corresponding to the determinant after transformation is converted to a lower triangular matrix, the diagonal components become zero in a range from the component in the (A+1)th row and the (A+1)th column to the component in the Bth row and the Bth column, thereby indicating that the original determinant is zero. For example, when the matrix of Expression 4 (wherein A=2 and B=3) is converted to a lower triangular matrix, the component in the 3rd row and the 3rd column becomes zero.

[2] When A≧B is satisfied for all pairs of divisors a and b of N (excepting 1 and N) (the rows are exchanged with the columns, and the number of types of residue systems of the row $\{n_q\}$ and a residue system which has the largest number of elements among the residue systems of the column $\{k_p\}$ are also considered), a matrix corresponding to the determinant after transformation can be converted to a lower triangular matrix without fail, thereby indicating that the original determinant is not zero.

Therefore, when N is a prime number, the above-described matrix has an inverse matrix. When N is not a prime number, sets $\{k_p\}$ and $\{n_q\}$ each consisting of M integers are considered for residue systems obtained for all pairs of divisors a and b (excepting 1 and N) of N (N=ab). When there exists a pair of divisors a and b of N such that the number A of types of a-based residue systems of $\{k_p\}$ is smaller than the maximum value B of the number of elements of residue systems of $\{n_q\}$, the determinant is zero. When such a pair of divisors a and b of N does not exist at all (the rows are exchanged with the columns, and the number of types of residue systems of the row $\{n_q\}$ and a residue system which has the largest number of elements among the residue systems of the column $\{k_p\}$ are also considered), the determinant is not zero.

Further, it is also apparent that the question of whether the M-by-M matrix whose element in the qth row and the pth column is $\exp(2\pi j k_p n_q/N)$ (sets $\{k_p\}$ and $\{n_q\}$ each consisting of M integers satisfy the conditions $1 \leq p, q \leq M$; $0 \leq k_p$, $n_q \leq N-1$; $k_p < k_{p+1}$; $n_q < n_{q+1}$) has an inverse matrix (whether the determinant is not zero) is equivalent to the question of whether an (N-M)-by-(N-M) matrix whose element in the q'th row and the p'th column is $\exp(2\pi j k_{p'} n_{q'}/N)$ ($1 \leq p'$, $q' \leq N-M$; $0 \leq k_{p'}$, $n_{q'} \leq N-1$; $k_{p'} < k_{p'+1}$; $n_{q'} < n_{q'+1}$; $k_{p'} \neq k_p$; $n_{q'} \neq n_q$) has an inverse matrix (i.e. the question of whether the determinant is not zero). This is because the above two matrices correspond to different M-by-M and (N-M)-by-(N-M) matrices extracted from the matrix of the N-point IDFT (an inverse matrix is the matrix of the DFT). This scheme is particularly effective for the case where M is greater than N/2, because fewer residue systems of sets can be considered.

Even when any set $\{n_q\}$ consisting of M mutually different integers is selected to be used together with a set $\{k_p\}$ consisting of M mutually consecutive integers, the M-by-M matrix whose element in the qth row and the pth column is $\exp(2\pi j k_p n_q/N)$ has an inverse matrix. Similarly, even when any set $\{k_p\}$ consisting of M mutually different integers is selected to be used together with a set $\{n_q\}$ consisting of M consecutive integers, the M-by-M matrix whose element in the qth row and the pth column is $\exp(2\pi j k_p n_q/N)$ has an inverse matrix. These statements are equivalent to each other.

Among these statements, the latter can be proved as follows. Specifically, the maximum value B of the number of elements of residue systems of the set $\{n_q\}$ consisting of M consecutive integers obtained by use of the above-described b (N=ab) is $-[-M/b]$. [R] is a Gauss symbol and represents the largest integer which is not greater than the real number R. The minimum value of the number A of types of residue systems of the set $\{k_p\}$ consisting of M different integers obtained by use of the above-described a becomes $-[-M/b]$, because the largest number of elements of the a-based residue systems obtained is b (=N/a). In other words, the maximum value B of the number of elements of b-based residue systems of the set $\{n_q\}$ consisting of M consecutive integers is equal to the minimum value of the number A of types of a-based residue systems of the set $\{k_p\}$ consisting of M different integers. At this time, B does not exceed A.

Moreover, if $N=c^m$ (c is a prime number, and m is an integer not less than 2), for the set $\{k_p\}$ consisting of M integers whose $c^{m'}$-based residue systems (m'=[$\log_c M$], [R] is a Gauss symbol and represents the largest integer which is not greater than the real number R) completely matches (in terms of types of residues systems and number of elements of each system) the set $\{k_p\}$ consisting of M consecutive integers, the M-by-M matrix whose element in the qth row and the pth column is $\exp(2\pi j k_p n_q/N)$ has an inverse matrix, whenever any set $\{n_q\}$ consisting of M different integers is selected. This is also true even when $\{n_q\}$ is exchanged with $\{k_p\}$. $c^{m'}$ (m'=[$\log_c M$]) is a factorial of the sole largest prime factor of N which is equal to or less than M. A set whose $c^{m'}$-based residue systems completely matches $\{k_p\}$ means a set of M different integers of not less than 0 but not greater than N-1 in which arbitrary $k_p$ of M consecutive integers has been replaced with one of $k_p \pm c m^{m'}$, $k_p \pm 2c_{m'}$, $k_p \pm 3c^{m'}$, ..., $k_p \pm (c^m - c)$ (however, those falling outside the range of 0 to N−1 are excluded).

[Summary Regarding Inverse Matrix]
1. When N is a prime number, a relevant matrix has an inverse matrix.
2. When at least one of $\{n_q\}$ and $\{k_p\}$ is a set consisting of M consecutive integers, the M-by-M matrix whose element in the qth row and the pth column is $\exp(2\pi j k_p n_q/N)$ has an inverse matrix.
3. When $N = c^m$ (c is a prime number, and m is an integer not less than 2), a relevant matrix has an inverse matrix even when none of $\{n_q\}$ and $\{k_p\}$ is a set consisting of M consecutive integers, as described above, provided that at least one of $\{n_q\}$ and $\{k_p\}$ is a set whose $c^{m'}$-based residue systems (m'=[$\log_c M$]) completely match, in terms of types of residues systems and number of elements of each system, the set consisting of M consecutive integers.
4. Even when $\{n_q\}$ and $\{k_p\}$ are not sets other than those described above, a relevant matrix has an inverse matrix, provided that the result of a study on residue systems of the sets for all pairs of divisors a and b of N (excepting 1 and N) shows that no pair of divisors a and b of N exists such that the number A of types of a-based residue systems of $\{k_p\}$ is smaller than the maximum value B of the number of elements of b-based residue systems of $\{n_q\}$, and that no pair of divisors a and b of N exists such that the number A of types of a-based residue systems of $\{n_q\}$ is smaller than the maximum value B of the number of elements of b-based residue systems of $\{k_p\}$.

Incidentally, it is apparent that when L desired rows are extracted from the above-described inverse matrix, which is an M-by-M matrix, so as to obtain an L-by-M matrix (L≦M), this matrix can be used to obtain L arbitrary carriers from M subcarriers by use of M sampling points. That is, matrices used to implement the demodulation method and the demodulation apparatus of the present invention are not limited to square matrices.

Moreover, it is clear that the discussions thus far can be applied to the case in which M subcarriers contain nullcarriers. Therefore, when (M−L) nullcarriers (L<M) are assumed to be contained in M subcarriers, it is apparent that the remaining L carriers can be obtained from M sampling points by use of a matrix which is obtained by extracting L rows, which are necessary for demodulation of the L carriers, from an M-by-M matrix which is an inverse matrix of the above-described M-by-M matrix whose element in the qth row and the pth column is $\exp(2\pi j k_p n_q/N)$. Specifically, such a matrix can be obtained through a procedure of forming an M-by-M matrix by not only using integers kp corresponding to L carriers but also provisionally using (M−L) arbitrary integers $k_p$ (excepting integers $k_p$ corresponding to the L carriers), obtaining an inverse matrix of the matrix, and extracting an L-by-M matrix (L<M) corresponding to the L carriers. Through simple consideration, an indefinite number of such L-by-M matrices can be formed.

[Regarding Other Multicarriers]

Although a communication method which utilizes N subcarriers having equal frequency intervals has been described with OFDM taken as a typical example, as is apparent from the above description, the essential feature of the present invention is not limited to the communication method using N subcarriers; the present invention can be applied to a communications system having any frequency intervals.

First Embodiment

FIG. 1 is a block diagram showing the configuration of a multicarrier demodulation apparatus 1000 according to a first embodiment of the present invention. The multicarrier demodulation apparatus 1000 corresponds to embodiments of the first to fourth features of the present invention. The multicarrier demodulation apparatus 1000 of the present embodiment receives an OFDM modulated signal which has a guard interval and consists of N subcarriers, including L effective carriers, and performs analog quadrature detection for the signal.

The multicarrier demodulation apparatus 1000 of FIG. 1 includes a synchronization circuit 101; an oscillation circuit 102; a phase shifter 1021; multipliers 103I and 103Q; LPFs 104I and 104Q; A/D converters 105I and 105Q; GI removal circuits 106I and 106Q; S/P converters 107I and 107Q; a complex linear operating circuit 108; a demapping circuit 109; and a P/S converter 110. Among these circuits, a part indicated as RCV serves as a sampling unit and an extraction unit, or a sampling and quadrature detection unit and an extraction unit. Further, the complex linear operating circuit 108 serves as a operating unit for demodulating to L subcarriers.

In response to an unillustrated pilot symbol for synchronization, the synchronization circuit 101 generates a synchronization signal. In response to the synchronization signal from the synchronization circuit 101, the oscillation circuit 102 generates a sine wave in synchronism with a main carrier. This sine wave is used by the multipliers 103I and 103Q for analog quadrature detection of a received signal. At this time, for one of the multipliers 103I and 103Q (the multiplier 103I in FIG. 1), the phase shifter 1021 shifts the phase of the sine wave by π/2. The low pass filters (LPFs) 104I and 104Q remove high frequency components from the outputs of the multipliers 103I and 103Q, thereby obtaining an in-phase component $I_A$ and a quadrature component $Q_A$. These components are fed to the analog/digital (A/D) converters 105I and 105Q, respectively.

The A/D converters 105I and 105Q sample the components at a sampling rate 1/(NΔf), where Δf is the frequency interval of N subcarriers. Subsequently, among N sampling points of an effective symbol duration excluding the guard interval, the last N−M sampling points (sample numbers M to N−1) are eliminated. Specifically, sampling points of the guard interval part and the first M sampling points (sample numbers 0 to M−1) among the N sampling points of the effective symbol duration are fed to the guard interval removal circuits (GI removal circuits) 106I and 106Q. The above-mentioned L, M, and N satisfy the relation L≦M<N.

Among the outputs of the A/D converters 105I and 105Q, the GI removal circuits 106I and 106Q supply to the serial-parallel (S/P) converters 107I and 107Q, respectively, outputs corresponding to M sampling points, while excluding the sampling points corresponding to the guard interval. 2M outputs of the S/P converters 107I and 107Q are M samples of the complex digital signal and are fed to the complex linear operating circuit 108.

The complex linear operating circuit 108 stores an L-by-M matrix extracted from an inverse matrix of a matrix whose element in the qth row and the pth column is $\exp(2\pi j k_p n_q/N)$, wherein $k_p$ is an element of a set $\{k_p\}$ consisting of the numbers of M subcarriers, including the numbers of L effective carriers, and $n_q$ is an element of a set $\{n_q\}$ consisting of the sample numbers 0 to M−1. While using the L-by-M matrix, the complex linear operating circuit 108 calculates data $X(k_p)$ carried by the L effective carriers from the product of the inverse matrix and a complex matrix whose elements are M complex digital signals $x(n_q)$ output from the S/P converters 107I and 107Q. In the present embodiment, the operation of the complex linear operating circuit 108 is realized by means of software. However, the operation of the complex linear operating circuit 108 may be realized by means of hardware and FIR. The thus-demodulated data are demapped by means of the demapping circuit 109 and output from the parallel-serial (P/S) converter 110 as a desired signal train.

The multicarrier demodulation apparatus 1000 of the present embodiment can demodulate each symbol at high speed, because before completion of A/D conversion of a single symbol length (extraction of N samples of the complex signal excluding the guard interval), A/D conversion of a shorter length (extraction of M (M<N) samples of the complex signal excluding the guard interval) is performed, and in a subsequent step, computation is performed by use of the M samples of the complex digital signal.

Second Embodiment

Figure 2:
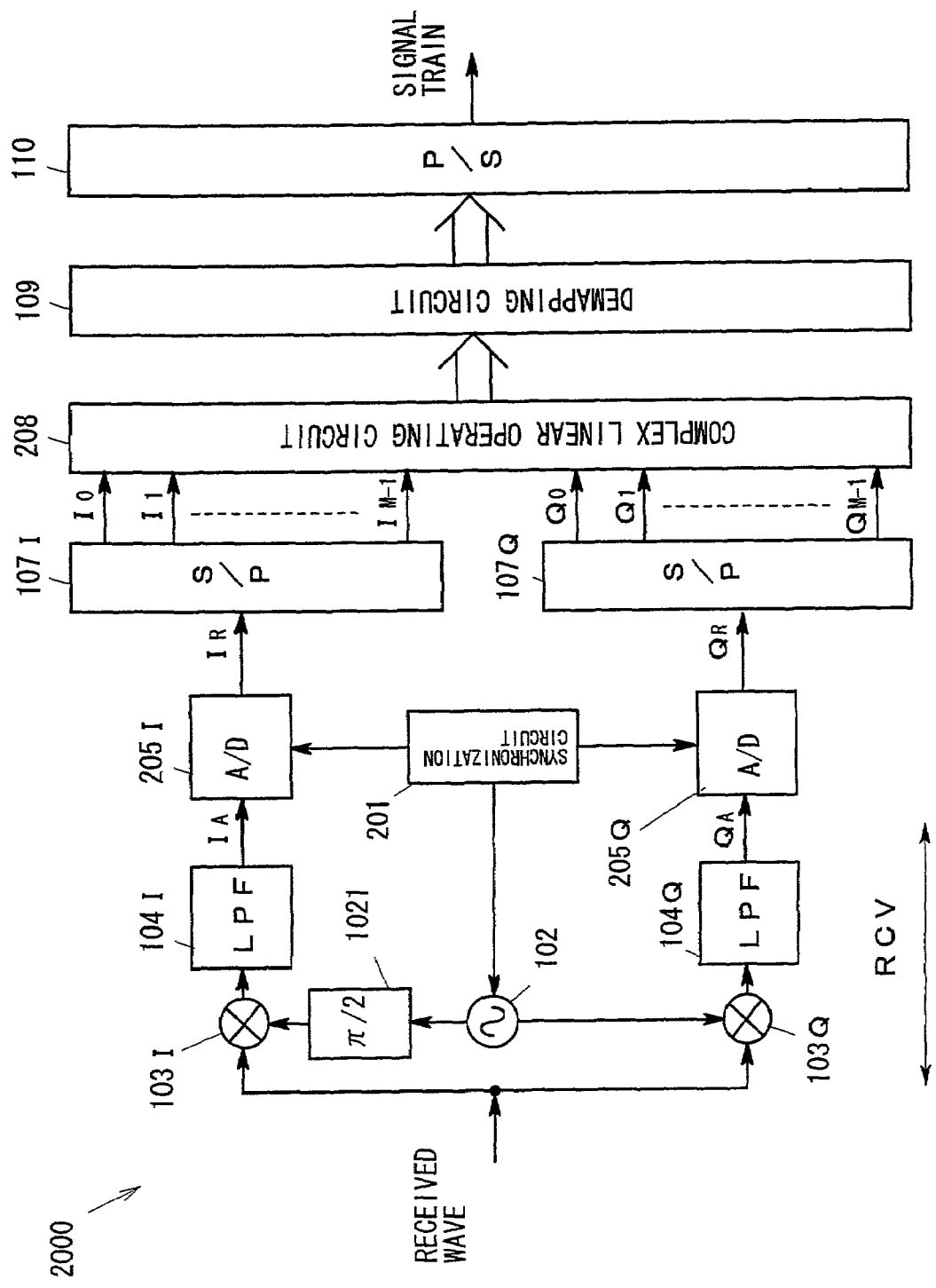
FIG. 2 is a block diagram showing the configuration of a multicarrier demodulation apparatus according to a second embodiment of the present invention.

FIG. 2 is a block diagram showing the configuration of a multicarrier demodulation apparatus 2000 according to a second embodiment of the present invention. The multicarrier demodulation apparatus 2000 corresponds to an embodiment regarding a modification the inventions of the second and fourth features of the present invention.

Among the constituent elements of the multicarrier demodulation apparatus 2000 of FIG. 2, those which perform the same operations as those performed in the multicarrier demodulation apparatus 1000 of FIG. 1 (excepting operation frequency and operation timing) are denoted by the same reference numerals. The multicarrier demodulation apparatus 2000 of FIG. 2 includes a synchronization circuit 201; an oscillation circuit 102; a phase shifter 1021; multipliers 103I and 103Q; LPFs 104I and 104Q; A/D converters 205I and 205Q; S/P converters 107I and 107Q; a complex linear operating circuit 208; a demapping circuit 109; and a P/S converter 110. Among these circuits, a part indicated as RCV serves as an analog quadrature detection unit; the A/D converters 205I and 205Q serve as a sampling unit; and the complex linear operating circuit 208 serves as a computing unit.

The synchronization signal fed from the synchronization circuit 201 to the oscillation circuit 102 is the same as the synchronization signal fed from the synchronization circuit 101 to the oscillation circuit 102 of the multicarrier demodulation apparatus of FIG. 1. As in the case of the first embodiment, the low pass filters (LPFs) 104I and 104Q remove high frequency components from the outputs of the multipliers 103I and 103Q, whereby an in-phase component $I_A$ and a quadrature component $Q_A$ obtained as a result of analog quadrature detection are fed to the analog/digital (A/D) converters 205I and 205Q, respectively.

The A/D converters 205I and 205Q sample the components at a sampling rate $\delta/(N\Delta f)$, where $\Delta f$ is the frequency interval of N subcarriers, and $\delta$ is a positive value smaller than 1. At this time, the A/D converters 205I and 205Q receive instructions from the synchronization circuit 201 in relation to sampling start and ending timings. Specifically, the synchronization circuit 201 supplies to the A/D converters 205I and 205Q sampling start and end signals different from the synchronization signal fed to the oscillator 102. In response to the sampling start signal, the A/D converters 205I and 205Q start sampling of the effective symbol from which the guard interval has been removed. Before reception of the sampling end signal (elapse of a time difference $\delta M/(N\Delta f)$), the A/D converters 205I and 205Q extract signal trains $I_R$ and $Q_R$ each consisting of M samples of the digital signal and supply them to the serial-parallel (S/P) converters 107I and 107Q, respectively. 2M outputs of the S/P converters 107I and 107Q are M samples of the complex digital signal and are fed to the complex linear operating circuit 208.

The complex linear operating circuit 208 stores an L-by-M matrix extracted from an inverse matrix of a matrix whose element in the qth row and the pth column is $\exp(2\pi j\delta k_p n_q/N)$, wherein $k_p$ is an element of a set $\{k_p\}$ consisting of the numbers of M subcarriers, including the numbers of L effective carriers, and $n_q$ is an element of a set $\{n_q\}$ consisting of the sample numbers 0 to M−1. While using the L-by-M matrix, the complex linear operating circuit 208 calculates data $X(k_p)$ carried by the L effective carriers from the product of the inverse matrix and a complex matrix whose elements are M complex digital signals $x(n_q)$ output from the S/P converters 107I and 107Q. In the present embodiment, the operation of the complex linear operating circuit 208 is realized by means of software. However, the operation of the complex linear operating circuit 208 may be realized by means of hardware and FIR. The thus-demodulated data are demapped by means of the demapping circuit 109 and are output from the parallel-serial (P/S) converter 110 as a desired signal train.

The multicarrier demodulation apparatus 2000 of the present embodiment can demodulate each symbol at higher speed, because before completion of A/D conversion of a single symbol length (time: $1/\Delta f$), A/D conversion of shorter length (time: $\delta M/(N\Delta f)$, M<N) is performed, and in a subsequent step, computation is performed by use of the M samples of the complex digital signal.

Third Embodiment

Figure 3:
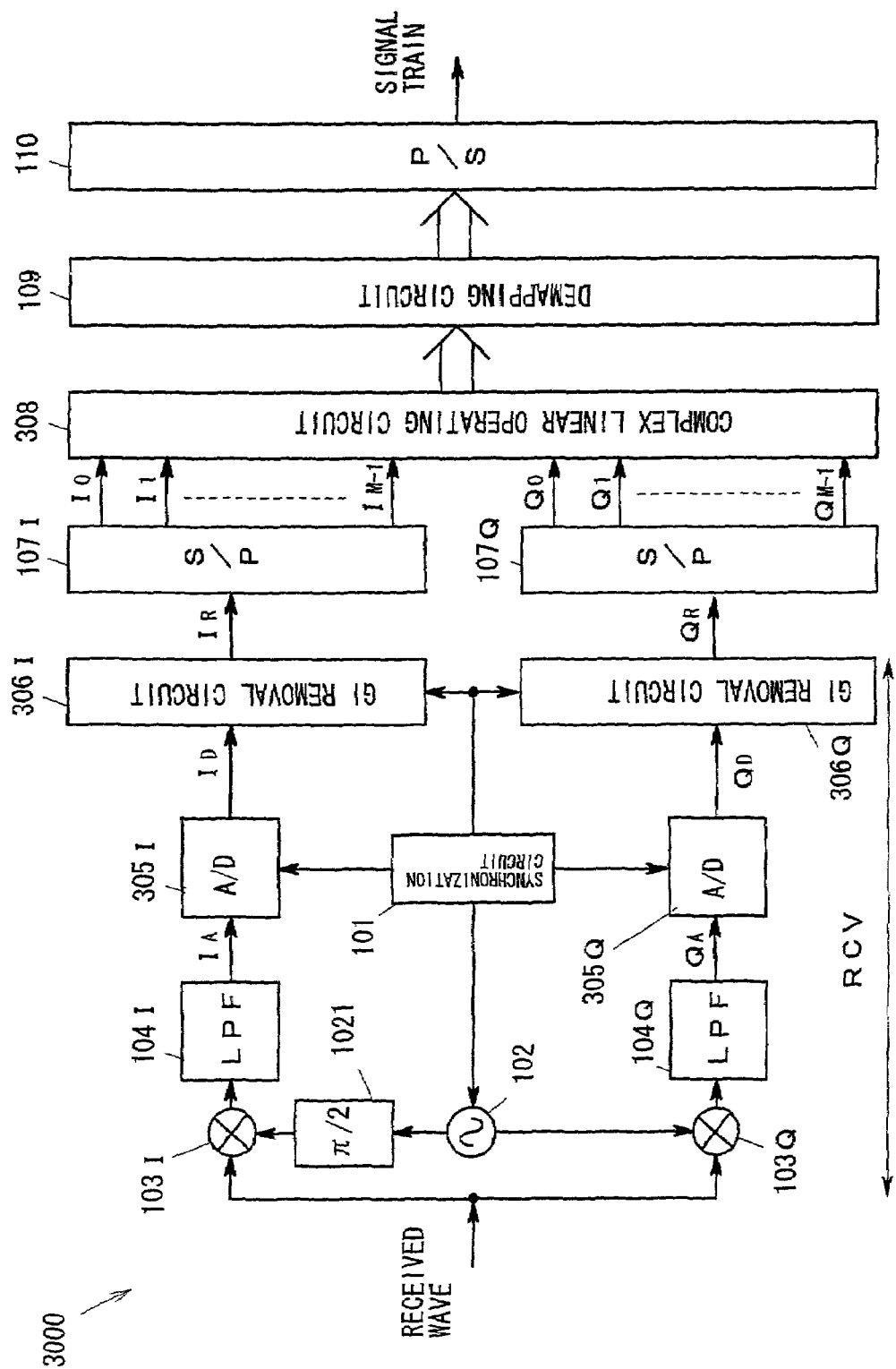
FIG. 3 is a block diagram showing the configuration of a multicarrier demodulation apparatus according to a third embodiment of the present invention.

FIG. 3 is a block diagram showing the configuration of a multicarrier demodulation apparatus 3000 according to a third embodiment of the present invention. The multicarrier demodulation apparatus 3000 corresponds to another modification of the inventions of the second and fourth features. The multicarrier demodulation apparatus 3000 of the present embodiment also receives an OFDM modulated signal which has a guard interval and consists of N subcarriers, including L effective carriers, and performs analog quadrature detection for the signal.

Among the constituent elements of the multicarrier demodulation apparatus 3000 of FIG. 3, those which perform the same operations as those performed in the multicarrier demodulation apparatus 1000 of FIG. 1 (excepting operation frequency and operation timing) are denoted by the same reference numerals. The multicarrier demodulation apparatus 3000 of FIG. 3 includes a synchronization circuit 101; an oscillation circuit 102; a phase shifter 1021; multipliers 103I and 103Q; LPFs 104I and 104Q; A/D converters 305I and 305Q; GI removal circuits 306I and 306Q; S/P converters 107I and 107Q; a complex linear operating circuit 308; a demapping circuit 109; and a P/S converter 110. Among these circuits, a part indicated as RCV serves as a digital sampling and detection unit; and the complex linear operating circuit 308 serves as a computing unit.

The operation starts in response to the synchronous signal supplied from the synchronization circuit 101 to the oscillation circuit 102. As in the case of the first embodiment, the low pass filters (LPFs) 104I and 104Q remove high frequency components from the outputs of the multipliers 103I and 103Q, whereby an in-phase component $I_A$ and a quadrature component $Q_A$, obtained as a result of analog quadrature detection, are fed to the analog/digital (A/D) converters 305I and 305Q, respectively.

The A/D converters 305I and 305Q sample the components at a sampling rate $1/(vN\Delta f)$, where $\Delta f$ is the frequency interval of N subcarriers, and v is a natural number not less than 2. Subsequently, the guard interval part and data corresponding to the first M sampling points (sample numbers 0 to M−1) of the effective symbol duration are fed to the guard interval removal circuits (GI removal circuits) 306I and 306Q. Since the guard interval is an integer multiple of the sampling rate, M−1 sampling points, from the start point of the effective symbol (sample number 0) to $(M-1)/(vN\Delta f)$ (sample number M−1), are used in subsequent computation.

The complex linear operating circuit 308 stores an L-by-M matrix extracted from an inverse matrix of a matrix whose element in the qth row and the pth column is $\exp(2\pi j k_p n_q/vN)$, wherein $k_p$ is an element of a set $\{k_p\}$ consisting of the numbers of M subcarriers, including the numbers of L effective carriers, and $n_q$ is an element of a set $\{n_q\}$ consisting of the sample numbers 0 to M−1. While using the L-by-M matrix, the complex linear operating circuit 308 calculates data $X(k_p)$ carried by the L effective carriers from the product of the inverse matrix and a complex matrix whose elements are M samples of the complex digital signal $x(n_q)$ output from the S/P converters 107I and 107Q. In the present embodiment, the operation of the complex linear operating circuit 308 is realized by means of software. However, the operation of the complex linear operating circuit 308 may be realized by means of hardware and FIR. The thus-demodulated data are demapped by means of the demapping circuit 109 and are output from the parallel-serial (P/S) converter 110 as a desired signal train.

The multicarrier demodulation apparatus 3000 of the present embodiment can demodulate each symbol at higher speed, because before completion of A/D conversion of a single symbol length (time: $1/\Delta f$), A/D conversion of a shorter length (time: $M/(vN\Delta f)$, $M<vN$) is performed, and in a subsequent step, computation is performed by use of the M samples of the complex digital signal.

Fourth Embodiment

Figure 4:
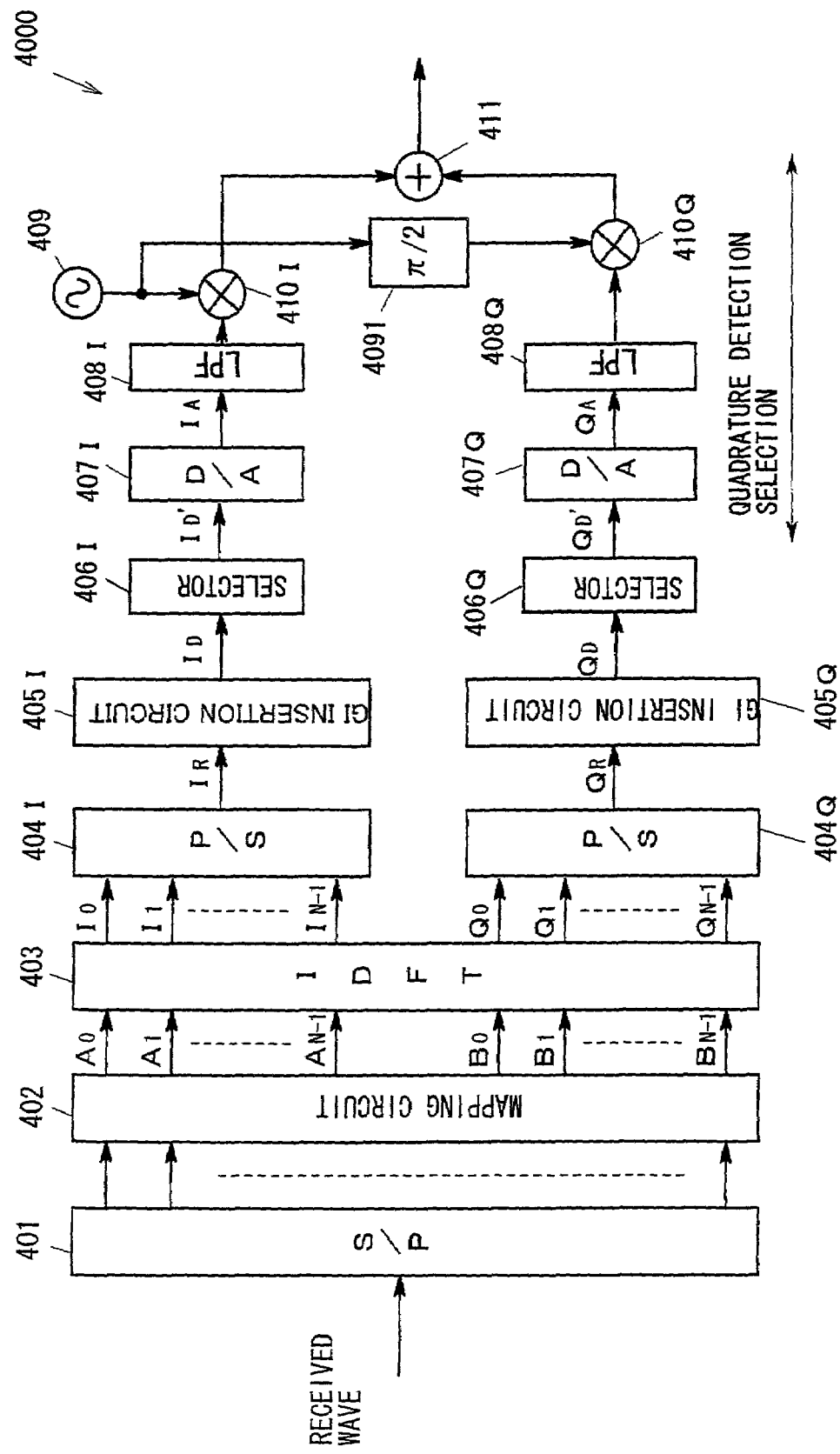
FIG. 4 is a block diagram showing the configuration of a multicarrier modulation apparatus according to a fourth embodiment of the present invention.

FIG. 4 is a block diagram showing the configuration of a multicarrier modulation apparatus 4000 according to a fourth embodiment of the present invention. The multicarrier modulation apparatus 4000 corresponds to embodiments of the fifth and sixth features of the present invention. The multicarrier modulation apparatus 4000 of the present embodiment generates, through inverse discrete Fourier transform (IDFT), an OFDM modulated signal to which a guard interval has been added and consisting of N subcarriers, including at least (N−M) nullcarriers, and transmits the signal by means of analog quadrature modulation.

The multicarrier modulation apparatus 4000 of FIG. 4 includes an S/P converter 401; a mapping circuit 402; an IDFT 403; P/S converters 404I and 404Q; GI insertion circuits 405I and 405Q; selectors 406I and 406Q; D/A converters 407I and 407Q; LPFs 408I and 408Q; an oscillator 409; a phase shifter 4091; multipliers 410I and 410Q, and an adder 411.

The operation of the multicarrier modulation apparatus 4000 of FIG. 4 is the same as that of a conventional OFDM modulation apparatus utilizing analog quadrature modulation, excepting operations of the selectors 406I and 406Q and actions and effects of the selectors 406I and 406Q on signals at stages subsequent to the selectors 406I and 406Q. Specifically, the serial-parallel (S/P) converter 401 converts to a parallel signal a signal train to be transmitted within a single symbol; and the mapping circuit 402 maps the parallel signal to $A_0, A_1, \ldots, A_{N-1}, B_0, B_1, \ldots, B_{N-1}$, which represent N complex symbols. The N complex symbols include M effective symbols or less. The N-point inverse discrete Fourier transform (IDFT) 403 converts the N complex symbols to $I_0, I_1, \ldots, I_{N-1}, Q_0, Q_1, \ldots, Q_{N-1}$, which represent N complex digital signal points. The parallel-serial (P/S) converters 404I and 404Q convert the N complex digital signal points to a serial signal train; and the guard interval (GI) insertion circuits 405I and 405Q insert guard intervals of a predetermined length to the serial signal train.

Subsequently, the selectors 406I and 406Q delete the last N-M signals from the outputs $I_D$ and $Q_D$ of the GI insertion circuits 405I and 405Q each consisting of N digital signals, excepting the guard interval part. Thus, signal trains $I'_D$ and $Q'_D$ each having an guard interval and an effective symbol part consisting of M samples of the digital signal are fed to the digital-analog (D/A) converters 407I and 407Q and are converted to analog signals. The sampling rate is $1/(N\Delta f)$. These analog signals are passed through the low pass filters (LPFs) 408I and 408Q. For these filtered signals, the multipliers 410I and 410Q perform analog quadrature modulation by use of two orthogonal sine waves; i.e., a first sine wave generated by the oscillator 409, which oscillates at a desired main carrier frequency, and a second sine wave shifted from the first sine wave by $\pi/2$ by means of the phase shifter 4091. The adder 411 adds these modulated signals and outputs a resultant signal.

The multicarrier modulation apparatus 4000 of the present embodiment enables high speed, high density communications, because the length of the effective symbol part excluding the guard interval is $M/(N\Delta f)$ ($M<N$), which is shorter than the effective symbol length $1/\Delta f$ of conventional OFDM. The following fifth to seventh embodiments show demodulation apparatuses to be combined with the multicarrier modulation apparatus 4000.

Fifth Embodiment

Figure 5:
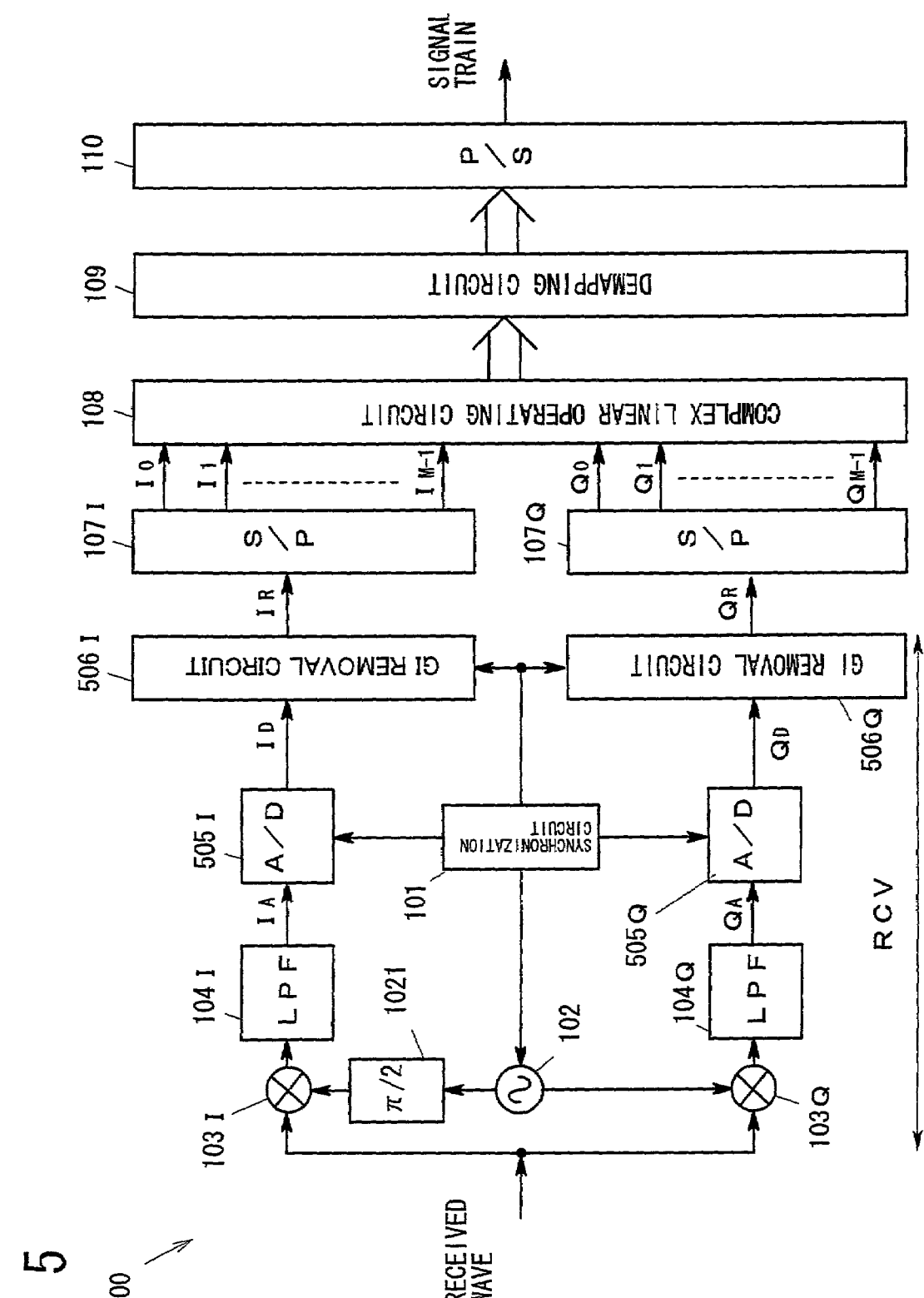
FIG. 5 is a block diagram showing the configuration of a multicarrier demodulation apparatus according to a fifth embodiment of the present invention.

FIG. 5 is a block diagram showing the configuration of a multicarrier demodulation apparatus 5000 according to a fifth embodiment of the present invention. The multicarrier demodulation apparatus 5000 corresponds to embodiments of the modification of the fifth and sixth features of the present invention and can perform communications through combination with the multicarrier modulation apparatus 4000 according to the fourth embodiment shown in FIG. 4.

Among the constituent elements of the multicarrier demodulation apparatus 5000 of FIG. 5, those which perform the same operations as those performed in the multicarrier demodulation apparatus 1000 of FIG. 1 (excepting operation frequency and operation timing) are denoted by the same reference numerals. The multicarrier demodulation apparatus 5000 of FIG. 5 includes a synchronization circuit 101; an oscillation circuit 102; a phase shifter 1021; multipliers 103I and 103Q; LPFs 104I and 104Q; A/D converters 505I and 505Q; GI removal circuits 506I and 506Q; S/P converters 107I and 107Q; a complex linear operating circuit 108; a demapping circuit 109; and a P/S converter 110. Among these circuits, a part indicated as RCV serves as a digital sampling and detection unit; and the complex linear operating circuit 108 serves as a computing unit.

The multicarrier modulation apparatus 4000 according to the fourth embodiment shown in FIG. 4 transmits a modulated signal whose effective symbol part has a length of M/(NΔf) (M<N) excepting the guard interval; and the multicarrier demodulation apparatus 5000 of FIG. 5 receives the transmitted signal. After performance of analog quadrature detection by use of the main carrier, the analog-digital (A/D) converters 505I and 505Q sample the detected signals at a sampling rate 1/(NΔf). As a result, digital signal trains $I_D$ and $Q_D$ each corresponding to a guard interval part and M samples of the complex digital signal of the effective symbol part are fed to the GI removal circuits 506I and 506Q, respectively. The GI removal circuits 506I and 506Q remove the guard interval parts and output to the serial-parallel (S/P) converters 107I and 107Q digital signal trains $I_R$ and $Q_R$ corresponding to the M samples of the complex digital signal. The method of demodulating a desired signal train from the digital signal trains $I_R$ and $Q_R$ corresponding to the M samples of the complex digital signal is identical with that employed in the first embodiment. As described above, when combined with the modulation apparatus of the fourth embodiment, the demodulation apparatus of the present embodiment enables high speed, high density communications, because communications performed are substantially OFDM communications, and communications can be performed while the effective symbol length is shortened.

Sixth Embodiment

Figure 6:
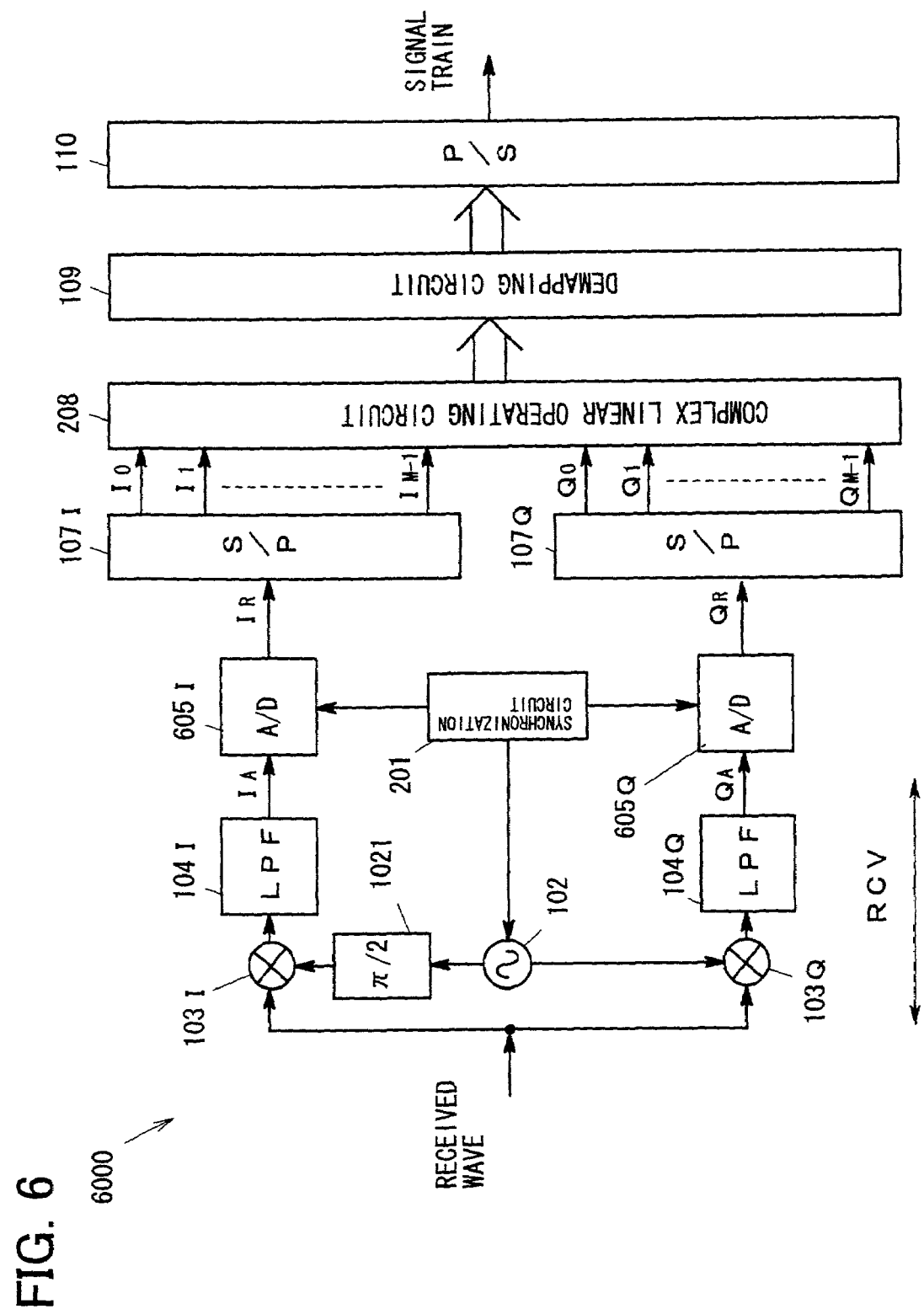
FIG. 6 is a block diagram showing the configuration of a multicarrier demodulation apparatus according to a sixth embodiment of the present invention.

FIG. 6 is a block diagram showing the configuration of a multicarrier demodulation apparatus 6000 according to a sixth embodiment of the present invention. The multicarrier demodulation apparatus 6000 corresponds to an embodiment of a modification of the inventions of the fifth and sixth features and also corresponds to a modification of the inventions of the second and fourth features which have been shown in the multicarrier demodulation apparatus 2000 of FIG. 2. The multicarrier demodulation apparatus 6000 can perform communications through combination with the multicarrier modulation apparatus 4000 according to the fourth embodiment shown in FIG. 4.

Among the constituent elements of the multicarrier demodulation apparatus 6000 of FIG. 6, those which perform the same operations as those performed in the multicarrier demodulation apparatus 2000 of FIG. 2 (excepting operation frequency and operation timing) are denoted by the same reference numerals. The multicarrier demodulation apparatus 2000 of FIG. 6 includes a synchronization circuit 201; an oscillation circuit 102; a phase shifter 1021; multipliers 103I and 103Q; LPFs 104I and 104Q; A/D converters 605I and 605Q; S/P converters 107I and 107Q; a complex linear operating circuit 208; a demapping circuit 109; and a P/S converter 110. Among these circuits, a part indicated as RCV serves as an analog detection unit; the A/D converters 605I and 605Q servers as a sampling unit; and the complex linear operating circuit 208 serves as a computing unit.

The multicarrier modulation apparatus 4000 according to the forth embodiment shown in FIG. 4 transmits a modulated signal whose effective symbol part has a length of M/(NΔf) (M<N) excepting the guard interval; and the multicarrier demodulation apparatus 6000 of FIG. 6 receives the transmitted signal. After performance of analog quadrature detection by use of the main carrier, the analog-digital (A/D) converters 605I and 605Q sample the detected signals at a sampling rate δ/(NΔf) (0<δ<1). As in the case of the multicarrier demodulation apparatus 2000 of FIG. 2, the synchronization circuit 201 outputs sampling start and end signals. As a result, digital signal trains $I_R$ and $Q_R$ corresponding to the M samples of the complex digital signal of the effective symbol part are supplied to the serial-parallel (S/P) converters 107I and 107Q. The method of demodulating a desired signal train from the digital signal trains $I_R$ and $Q_R$ corresponding to the M samples of the complex digital signal is identical with that employed in the second embodiment. As described above, when combined with the modulation apparatus of the fourth embodiment, the demodulation apparatus of the present embodiment enables high speed, high density communications, because the demodulation apparatus enables communications which are substantially OFDM communications and performed in such a manner that received waves having a shortened effective symbol length are sampled over a shortened period, and then demodulated.

Seventh Embodiment

Figure 7:
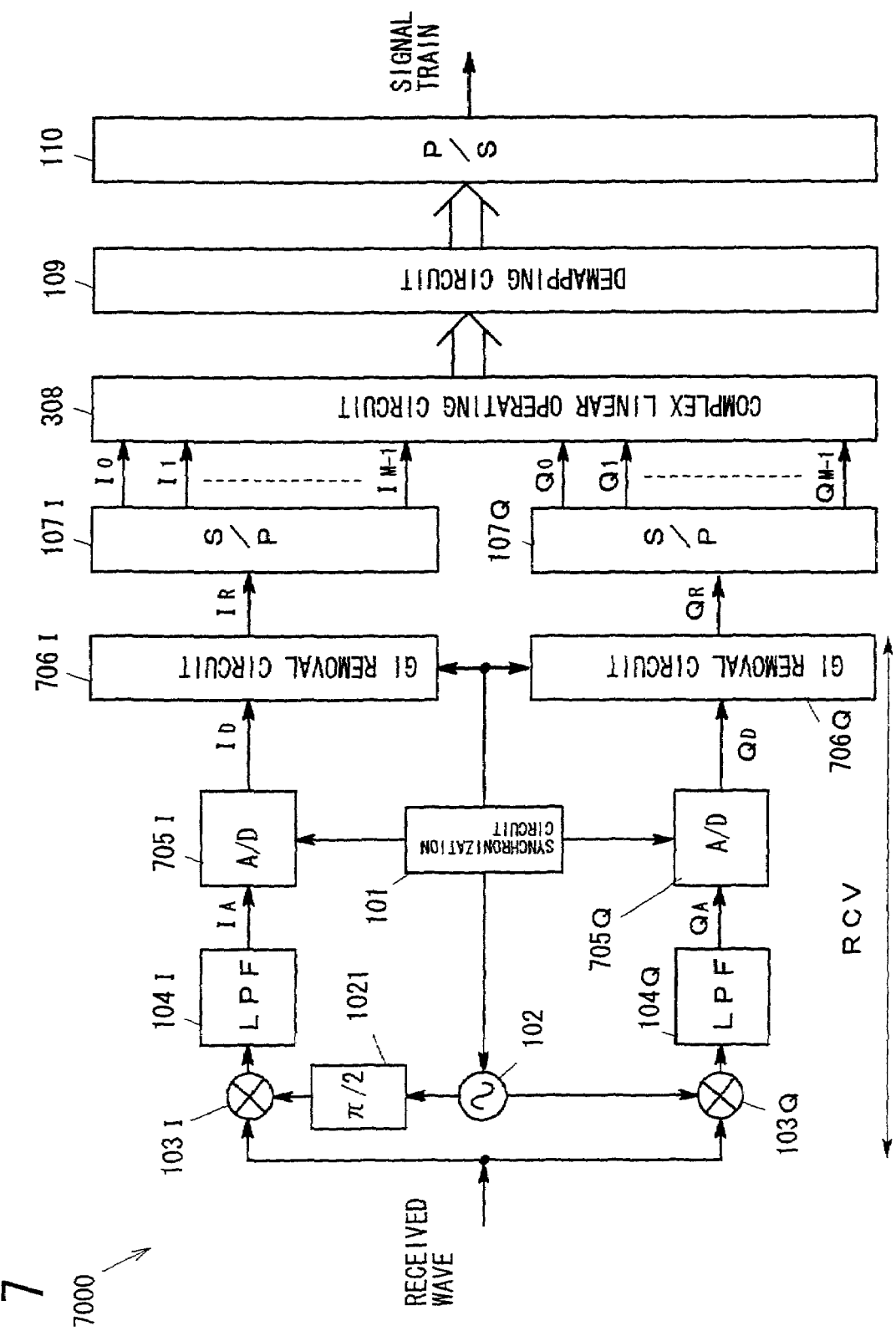
FIG. 7 is a block diagram showing the configuration of a multicarrier demodulation apparatus according to a seventh embodiment of the present invention.

FIG. 7 is a block diagram showing the configuration of a multicarrier demodulation apparatus 7000 according to a seventh embodiment of the present invention. The multicarrier demodulation apparatus 7000 corresponds to an embodiment of another modification of the inventions of the fifth and sixth features and also corresponds to an embodiment of another modification of the inventions of the second and fourth features which have been shown in the multicarrier demodulation apparatus 3000 of FIG. 3. The multicarrier demodulation apparatus 7000 can perform communications through combination with the multicarrier modulation apparatus 4000 according to the fourth embodiment shown in FIG. 4.

Among the constituent elements of the multicarrier demodulation apparatus 7000 of FIG. 7, those which perform the same operations as those performed in the multicarrier demodulation apparatus 3000 of FIG. 3 (excepting operation frequency and operation timing) are denoted by the same reference numerals. The multicarrier demodulation apparatus 7000 of FIG. 7 includes a synchronization circuit 101; an oscillation circuit 102; a phase shifter 1021; multipliers 103I and 103Q; LPFs 104I and 104Q; A/D converters 705I and 705Q; GI removal circuits 706I and 706Q; S/P converters 107I and 107Q; a complex linear operating circuit 308; a demapping circuit 109; and a P/S converter 110. Among these circuits, a part indicated as RCV serves as a digital sampling and detection unit; and the complex linear operating circuit 308 serves as a computing unit.

The multicarrier modulation apparatus 4000 according to the fourth embodiment shown in FIG. 4 transmits a modulated signal whose effective symbol part has a length of M/(NΔf) (M<N) excepting the guard interval; and the multicarrier demodulation apparatus 7000 of FIG. 7 receives the transmitted signal. After performance of analog quadrature detection by use of the main carrier, the analog-digital (A/D) converters 705I and 705Q sample the detected signals at a sampling rate 1/(νNΔf) (ν is a natural number not less than 2). Subsequently, the guard interval part and data regarding the first M sampling points (sample numbers 0 to M−1) of the effective symbol duration are fed to the guard interval removal circuits (GI removal circuits) 706I and 706Q. Since the guard interval is an integer multiple of the sampling rate, M−1 sampling points, from the start point of the effective symbol (sample number 0) to (M−1)/(νNΔf) (sample number M−1), are used in subsequent computation. As a result, the guard interval parts and digital signal trains $I_D$ and $Q_D$ corresponding to M samples of the complex digital signal of the effective symbol part are fed to the GI removal circuits 706I and 706Q, respectively. The GI removal circuits 706I and 706Q remove the guard interval parts and output to the serial-parallel (S/P) converters 107I and 107Q digital signal trains $I_R$ and $Q_R$ corresponding to the M samples of the complex digital signal. The method of demodulating a desired signal train from the digital signal trains $I_R$ and $Q_R$ corresponding to the M samples of the complex digital signal is identical with that employed in the third embodiment. As described above, when combined with the modulation apparatus of the fourth embodiment, the demodulation apparatus of the present embodiment enables high speed, high density communications, because communications performed are substantially OFDM communications, and communications can be performed while the effective symbol length is shortened.

In the above-described embodiments, the cases in which analog quadrature detection or analog quadrature modulation is employed are described. However, the present invention covers the cases in which digital quadrature detection or digital modulation is employed.

In such a case, the modulation apparatus may be modified as follows. The sampling rate during modulation is made four times, for example; sampled signals are subjected to quadrature modulation performed by use of sine and cosine waves having a frequency of 1/NΔf, which is generated by means of a numerical control oscillator, in order to obtain a signal having a frequency band of 1/2NΔf to 3/2NΔf, which is then subjected to frequency conversion. Moreover, the demodulation apparatus may be modified as follows. The sampling rate during demodulation is made four times, for example; sampled signals are subjected to quadrature detection performed by use of sine and cosine waves having a frequency of 1/NΔf, which is generated by means of a numerical control oscillator, in order to obtain a complex signal having a frequency band of 1/2NΔf to 3/2NΔf, which is then converted to N complex signals by use of a down sampler. When the third and seventh embodiments are modified to employ digital quadrature detection, sampling is naturally made four times, with the special sampling rate shown in the third and seventh embodiments being used as a reference. When modulation is performed by means of inverse discrete Fourier transform, N-point inverse discrete Fourier transform may be employed; and a modulated wave consisting of N subcarriers may be generated by a method utilizing 2N-point or 4N-point inverse discrete Fourier transform.

The above-described embodiments exemplify the case in which OFDM signals having guard intervals are received or are transmitted and received. However, guard intervals are not essential for implementation of the present invention, and the method of communications is not limited to OFDM.

In the above-described embodiments, complex linear operation circuits are used for conventional demodulation. However, another complex linear operation circuit may be added to the demodulation apparatus in order to demodulate symbols having pilot signals, which is performed by use of fewer carriers in accordance with the present invention.

Next, preferred embodiments in relation to the seventh to fourteenth features of the present invention will be described.

First, a pseudo inverse matrix in relation to the seventh and eleventh features will be described. An OFDM-type carrier such that the waveform x(n) at the nth point (n is an integer of 0 to N−1) satisfies the following Expression (5) will be considered. X(k) is a symbol carried by the kth subcarrier (k is an integer of 0 to N−1). Further, each of x(n) and X(k) is a complex number.

$$x(n) = \frac{1}{N}\sum_{k=0}^{N-1} X(k)W_N^{-kn} \quad (5)$$

where $$W_N = \exp\left(-\frac{2\pi j}{N}\right),$$

j is the imaginary unit.

Expression 5 shows that a column vector consisting of N complex numbers x(n) is the product of an N-by-N matrix whose element in the (n+1)th row and the (k+1)th column is $W_N^{-kn}$ and a column vector consisting of N complex numbers X(k). Here, the left side of Expression 5 is considered to be a vector; and the right side of Expression 5 is considered to be the product of a matrix and a vector. When both sides of Expression 5 are multiplied from the left by an inverse matrix of the N-by-N matrix whose element in the (n+1)th row and the (k+1)th column is $W_N^{-kn}$; i.e., an N-by-N matrix whose element in the (k+1)th row and the (n+1)th column is $W_N^{kn}$, a column vector consisting of N complex numbers X(k) can be obtained from the product of the above matrix and a column vector consisting of N complex numbers x(n). This is the relation between the modulation side N-point inverse discrete Fourier transform (IDFT) and the demodulation side N-point discrete Fourier transform (DFT), which are generally used in OFDM.

Here, it is assumed that among N subcarriers, N-L (L<N) subcarriers have null symbols (X(k)=0). In this case, the right side of Expression 5 becomes the product of an N-by-L matrix and a column vector consisting of L complex numbers $X(k_p)$ in which X(k) is not 0. Moreover, when attention is paid only to M complex numbers (L≦M<N, for example, integers $n_q$ of N-M to N−1) among the n complex numbers x(n), which represent the waveform, a column vector consisting of M complex numbers $x(n_q)$ is the product of an M-by-L matrix whose element in the qth row and the pth column is $W_N^{-k_p n_q}$ and a column vector consisting of L complex numbers $X(k_p)$. This can be expressed as follows.

$$x(n_q) = \frac{1}{N}\sum_{k_p} X(k_p)\exp\left(2\pi j k_p \frac{n_q}{N}\right) \quad (6)$$

When the rank of an M-by-L matrix A whose element in the qth row and the pth column is $W_N^{-k_p n_q}$ is L, a so-called pseudo inverse matrix exists in the form of an L-by-M matrix obtained as $(A^*A)^{-1}A^*$. Notably, $A^*$ is an L-by-M transposed conjugate matrix of A; and $A^*A$ is an L-by-L matrix. Here, the left side of Expression 6 is considered to be a vector; and the right side of Expression 6 is considered to be the product of a matrix and a vector. When both sides of Expression 6 are multiplied from the left by the pseudo inverse matrix $(A^*A)^{-1}A^*$, a column vector consisting of L complex numbers $X(k_p)$ can be obtained from the product of the above matrix and a column vector consisting of M complex numbers $x(n_q)$. This is the demodulation-side linear operation used in the present invention. Moreover, obtaining the pseudo inverse matrix $(A^*A)^{-1}A^*$ is the matrix computation of the present invention. Specifically, $(A^*A)^{-1}A^*$ is obtained in the matrix computation section of the eleventh feature of the present invention; and the column vector consisting of M complex numbers $x(n_q)$ is multiplied from the left by $(A^*A)^{-1}A^*$ in the linear operation section.

Even when the rank of the M-by-L matrix A whose element in the qth row and the pth column is $W_N^{-k_p n_q}$ is smaller than L, the L-by-M matrix is obtained uniformly as follows; and a column vector consisting of L complex numbers is obtained from the product of the L-by-M matrix and the column vector consisting of M complex numbers $x(n_q)$. When the rank of the M-by-L matrix A is represented by r ($r \leq L$), the matrix A can be subjected to the following "diagonalization" by use proper unitary matrices U (M×M) and V (L×L) (the singular value decomposition theorem or the Autonne-Eckart-Young theorem).

$$U^*AV = \begin{pmatrix} \Sigma & 0 \\ 0 & 0 \end{pmatrix} \quad (7)$$

where $\Sigma = \text{diag}(\sigma_1, \sigma_2, \ldots, \sigma_r)$, $U^*$ is a transposed conjugate matrix of U, and 0 is a zero matrix.

$\sigma_1, \sigma_2, \ldots, \sigma_r$ are positive and are non-zero singular values of the M-by-L matrix A; and non-zero eigen values of the L-by-L matrix $A^*A$ are $\sigma_1^2, \sigma_2^2, \ldots, \sigma_r^2$. In view of this, the pseudo inverse matrix $A^+$ is obtained as follows. $A^+$ is an L-by-M matrix.

$$A^+ = V \begin{pmatrix} \Sigma^{-1} & 0 \\ 0 & 0 \end{pmatrix} U^* \quad (8)$$

where $\Sigma^{-1} = \text{diag}(\sigma_1^{-1}, \sigma_2^{-1}, \ldots, \sigma_r^{-1})$, $U^*$ is a transposed conjugate matrix of U, and 0 is a zero matrix.

As described above, even when the rank r of the M-by-L matrix A is not equal to L, use of the pseudo inverse matrix $A^+$ of Expression 8 enables obtainment of the column vector consisting of L complex numbers from the product of the pseudo inverse matrix $A^+$ and the column vector consisting of M complex numbers $x(n_q)$. This can be considered to be obtaining approximate solutions of L complex numbers $X(k_p)$ by the method of least squares. Moreover, when the L complex numbers $X(k_p)$ are obtained from M' waveforms (M'>N), the pseudo inverse matrix can be obtained in the same manner as described above (the eighth and twelfth features).

Moreover, the matched filters of the ninth, tenth, thirteenth, and fourteenth features of the present invention require information regarding an excess delay. Each of the matched filters is formed by multiplying the respective subcarriers of a to-be-used symbol part by time-reversed waveforms. Specifically, the following computation is performed at the matched filter. The column vector x consisting of M complex numbers $x(n_q)$ is multiplied from the left by the above-described L-by-M matrix $A^*$. The respective components of the column vector consisting of L complex numbers and serving as an output are respective separated carrier signals.

$$A^*x \quad (9)$$

where $A^*$ is a transposed conjugate matrix of A.

Eighth Embodiment

Figure 8:
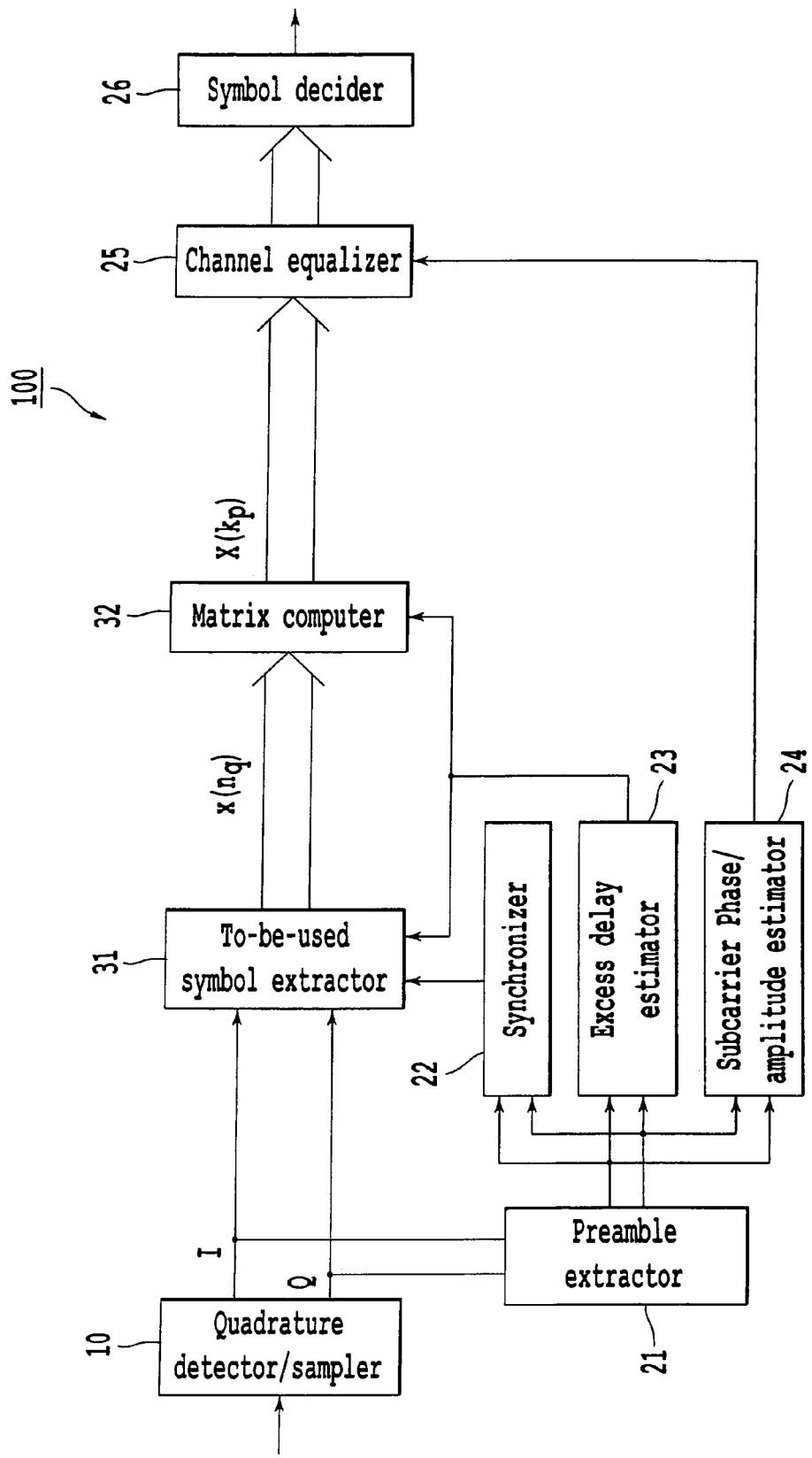
FIG. 8 is a block diagram showing the configuration of a multicarrier demodulation apparatus 100 according to an eighth embodiment of the present application.

FIG. 8 is a block diagram showing the configuration of a multicarrier demodulation apparatus 100 according to an eighth embodiment of the present invention. The multicarrier demodulation apparatus 100 includes a quadrature detection and sampling section 10, a preamble extraction section 21, a synchronization section 22, an excess delay estimation section 23, a subcarrier phase/amplitude estimation section 24, a to-be-used symbol extraction section 31, a matrix computation and linear operation section 32, a propagation channel characteristic equalization section 25, and a symbol decision section 26. In the present embodiment, there will be shown a demodulation apparatus for demodulating data from an OFDM modulated wave having a preamble (a pilot symbol) and a guard interval. It is assumed that the number of carriers is N, and the number of effective carriers is L (L<N). The present embodiment corresponds to the seventh, eighth, eleventh, and twelfth features of the present invention.

The quadrature detection and sampling section 10 forms digital signal trains of so-called in-phase and quadrature components I and Q. Specifically, these digital signal trains are the real parts and imaginary parts of $N+(NT_{GI}/T)$ samples of a complex digital signal quadrature-detected at sampling intervals T/N, where T is the length of the effective symbol, and $T_{GI}$ is the length of the guard interval added before the effective symbol. Among these outputs, the preamble (pilot signal) is detected by means of the preamble extraction section 21. Thus, on the basis of data within the symbol duration having the preamble (pilot signal), the synchronization section 22 establishes synchronized operation of the entire demodulation apparatus. Moreover, the excess delay estimation section 23 detects an excess delay with respect to the latest delayed wave. The subcarrier phase/amplitude estimation section 24 detects the phases and amplitudes of the subcarriers and outputs data for equalization.

On the basis of the synchronization signal from the synchronization section 22 and the data output from the excess delay estimation section 23 that represents the excess delay with respect to the latest delayed wave, the to-be-used symbol extraction section 31 extracts a to-be-used symbol from the digital signal trains of the in-phase and quadrature components I and Q as follows. From the real parts and imaginary parts of $N+(NT_{GI}/T)$ samples of the complex digital signal, the to-be-used symbol extraction section 31 extracts M' samples ($L \leq M' < N+(NT_{GI}/T)$) are extracted, starting from the end of the effective symbol. Here, $T+T_{GI}-(M'T/N)$ is greater than the excess delay with respect to the latest delayed wave.

Subsequently, the M' complex numbers $x(n_q)$ output from the to-be-used symbol extraction section 31 and the data output from the excess delay estimation section 23 and representing the excess delay with respect to the latest delayed wave are supplied to the matrix computation and linear operation section 32. The matrix computation and linear operation section 32 calculates the pseudo inverse matrix (L×M') of the M'-by-L matrix A ($L \leq M'$) whose element in the qth row and the pth column is $\exp(2\pi j k_p n_q/N)$ from a set $\{k_p\}$ consisting of the numbers of L subcarriers and a set $\{n_q\}$ consisting of the numbers of M' sampling points. When L=M', the inverse matrix is an ordinary inverse matrix $A^{-1}$. When L<M, the inverse matrix is obtained as $(A^*A)^{-1}A^*$, where $A^*$ is a transposed conjugate matrix of A. As described above, the complex signals $X(k_p)$ of the L subcarriers are obtained by multiplying the M' complex numbers $x(n_q)$ by the inverse matrix. In this manner, the L effective carriers can be demodulated from the section which is not affected by the latest delayed wave. The complex signals $X(k_p)$ of the L subcarriers are supplied to the propagation channel characteristic equalization section 25. The propagation channel characteristic equalization section 25 performs equalization processing on the basis of data output from the subcarrier phase/amplitude estimation section 24 and representing the phases and amplitudes of the respective subcarriers. Subsequently, the symbol decision section 26 outputs a demodulated-data signal train by use of the equalized signals.

FIG. 9 shows operation of the multicarrier demodulation apparatus 100. When a delayed wave which is delayed from an earliest arrival wave by a time greater than the length of the guard interval has arrived at the multicarrier demodulation apparatus 100 as shown in FIG. 9A, the L subcarriers can be demodulated from a to-be-used symbol shorter than the effective symbol. When a delayed wave which is delayed from an earliest arrival wave by a time less than the length of the guard interval has arrived at the multicarrier demodulation apparatus 100 as shown in FIG. 9B, the S/N ratio can be improved by means of a to-be-used symbol longer than the effective symbol.

Figure 10:
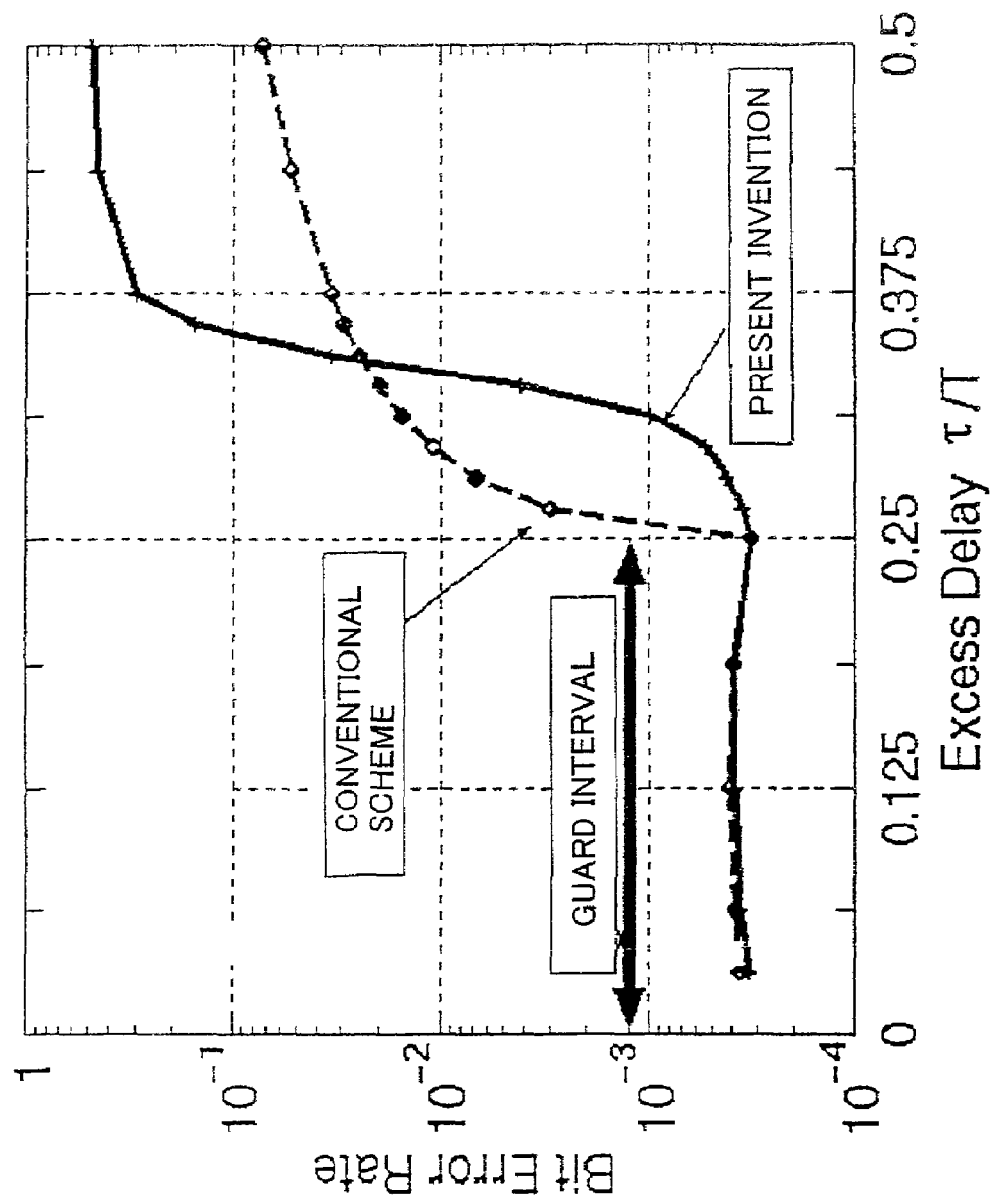
FIG. 10 is a graph showing the relation between delayed waves and error rate of the multicarrier demodulation apparatus 100 as obtained through simulation.

FIG. 10 shows results of simulation of the multicarrier demodulation apparatus 100. In the simulation, L (=52) subcarriers containing DC carriers as nullcarriers were used; $T_{GI}=T/4$; QPSK was used for subcarrier modulation; the power of a delayed wave was set equal to that of a desired wave; the average bit energy to noise power density ratio was set to 30 dB; and the product of the Doppler frequency due to movement and the symbol length was set to 0.000032. As is understood from FIG. 10, the present invention can realize a demodulation apparatus whose error rate does not increase greatly irrespective of arrival of a delayed wave having an excess delay about T/16 greater than the guard interval (total length: 5T/16).

Ninth Embodiment

Figure 11:
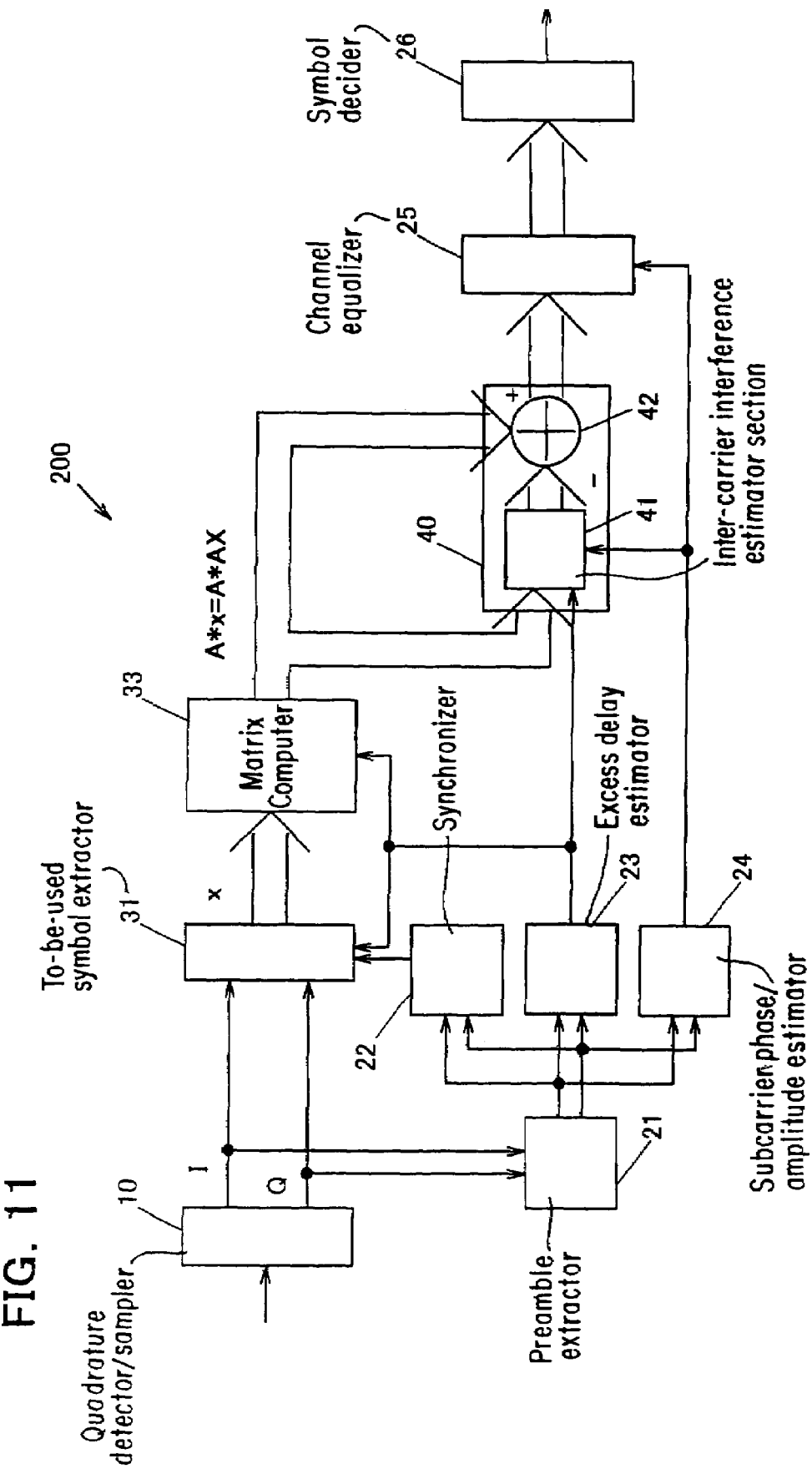
FIG. 11 is a block diagram showing the configuration of a multicarrier demodulation apparatus 200 according to a ninth embodiment of the present application.
Figure 12:
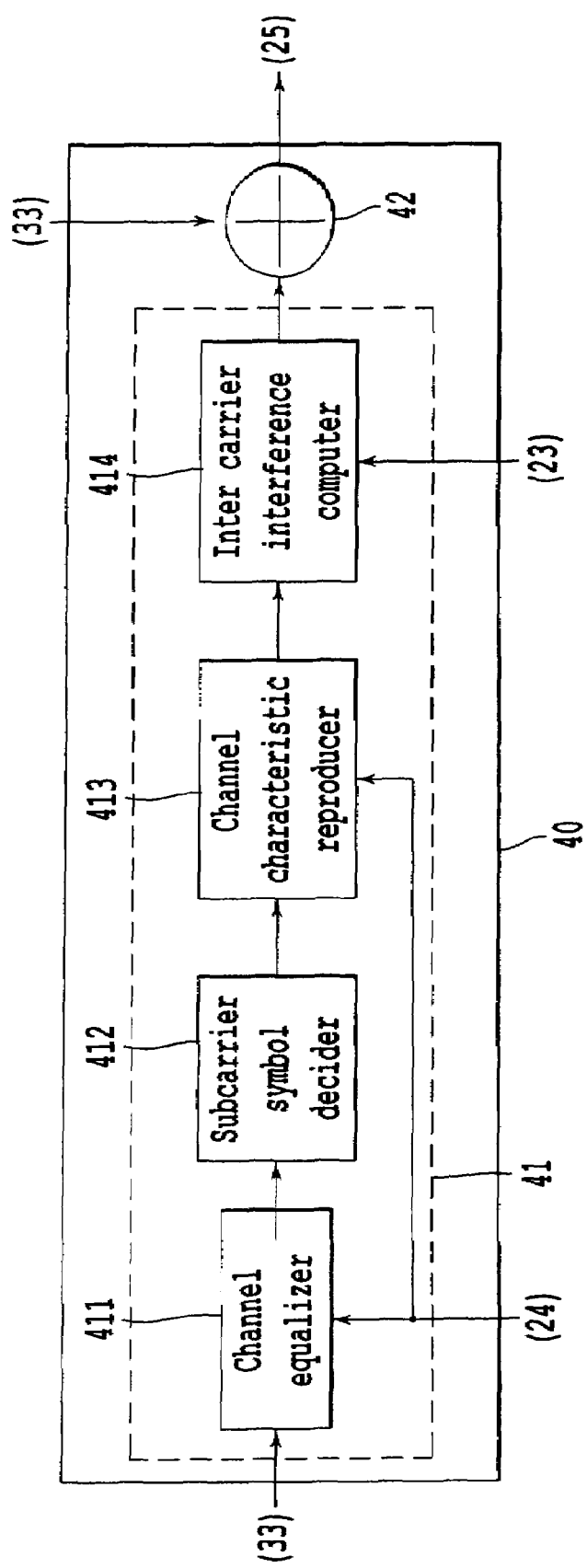
FIG. 12 is a block diagram showing the details of an inter-carrier interference removal section 40, which is a constituent element of the multicarrier demodulation apparatus 200.

FIG. 11 is a block diagram showing the configuration of a multicarrier demodulation apparatus 200 according to a ninth embodiment of the present invention. The multicarrier demodulation apparatus 200 includes a quadrature detection and sampling section 10, a preamble extraction section 21, a synchronization section 22, an excess delay estimation section 23, a subcarrier phase/amplitude estimation section 24, a to-be-used symbol extraction section 31, a matched filter section 33, an inter-carrier interference removal section 40, a propagation channel characteristic equalization section 25, and a symbol decision section 26. The inter-carrier interference removal section 40 includes an inter-carrier interference estimation section 41 and a subtractor 42. As shown in FIG. 12, the inter-carrier interference estimation section 41 includes a propagation channel characteristic equalization section 411, a subcarrier symbol decision section 412, a propagation channel characteristic reproduction section 413, and an inter-carrier interference component computation section 414. In the present embodiment, there will be shown a demodulation apparatus for demodulating an OFDM modulated wave having a preamble (a pilot symbol) and a guide interval to data. It is assumed that the number of subcarriers is N, and the number of effective subcarriers is L (L<N). The present embodiment corresponds to the ninth, tenth, thirteenth, and fourteenth features of the present invention. The propagation channel characteristic equalization section 411 and the subcarrier symbol decision section 412 serve as a tentative symbol decision unit; the propagation channel characteristic reproduction section 413 and the inter-carrier interference component computation section 414 serve as an interference component estimation unit; the subtractor 42 serves as an interference component subtraction unit; and the inter-carrier interference removal section 40 serves as an interference component removal unit.

In the multicarrier demodulation apparatus 200, the quadrature detection arid sampling section 10 forms digital signal trains of so-called in-phase and quadrature components I and Q. Subsequently, as in the eighth embodiment, the to-be-used symbol extraction section 31 extracts a to-be-used symbol. The matched filter section 33 calculates L complex signals by use of matched filters corresponding to the subcarriers and matched to the length of the extracted to-be-used symbol. Here, influence of noise is minimized through separation of the L complex signals, which are the outputs of the matched filter section 33 of the multicarrier demodulation apparatus 200, by use of matched filters matched to the subcarriers. However, since the complex signals contain interference components stemming from interference with other subcarriers, the complex signals are processed by means of the inter-carrier interference removal section 40.

The signals of the subcarriers separated by means of the matched filter section 33 are subjected to equalization processing which the propagation channel characteristic equalization section 411 performs on the basis of data output from the subcarrier phase/amplitude estimation section 24 and representing the phases and amplitudes of the respective subcarriers. Subsequently, the signals are fed to the subcarrier symbol decision section 412 and subjected to tentative symbol decision. Next, the signals are fed to the propagation channel characteristic reproduction section 413 in order to reproduce influences of the characteristics of the propagation channel on the basis of data output from the subcarrier phase/amplitude estimation section 24 and representing the phases and amplitudes of the respective subcarriers. Subsequently, the signals are fed to the inter-carrier interference component computation section 414. The inter-carrier interference component computation section 414 calculates inter-carrier interference on the basis of the length of the to-be-used symbol obtained from the data output from the excess delay estimation section 23 and representing the excess delay with respect to the delayed wave. The subtractor 42 subtracts the thus-obtained inter-carrier interference from the signals of the subcarriers separated by means of the matched filter section 33. Thus, more accurate subcarrier signals can be obtained.

Figure 13:
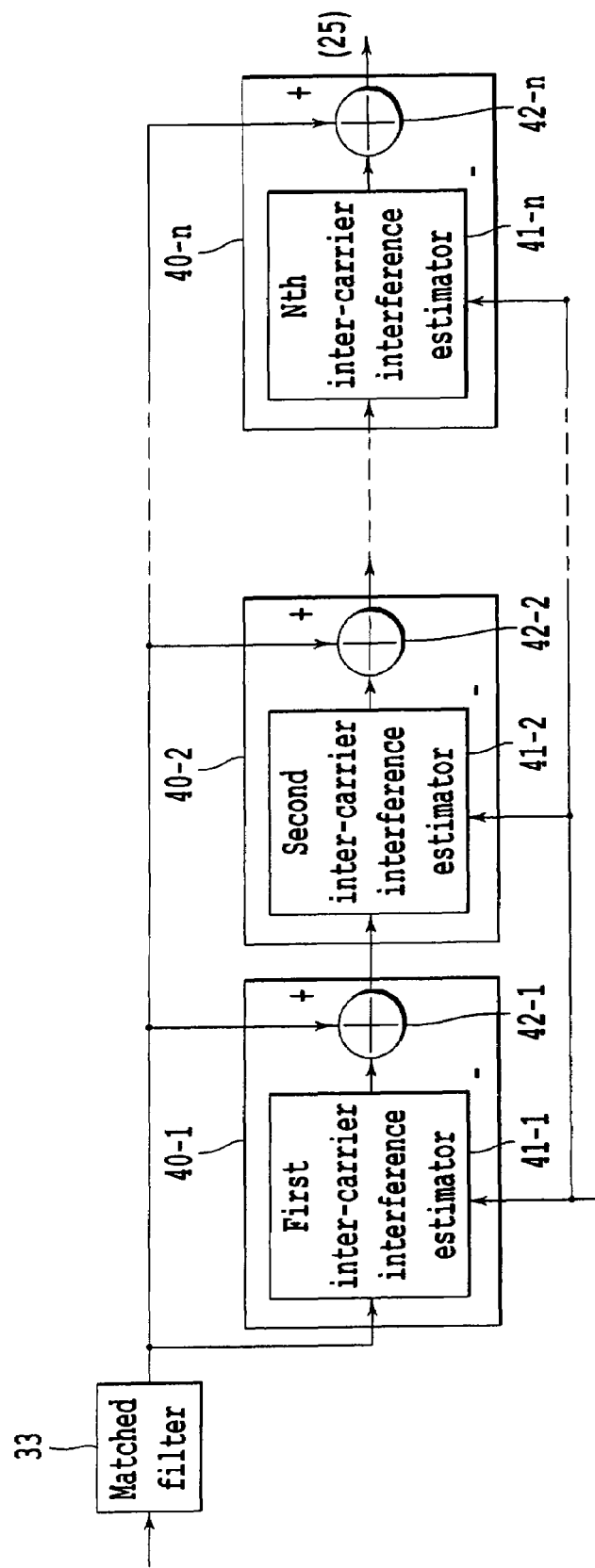
FIG. 13 is a block diagram showing a multi-stage configuration of the inter-carrier interference removal section 40, which is a constituent element of the multicarrier demodulation apparatus 200.

The subcarrier signals having increased accuracy may be successively processed by means of the propagation channel characteristic equalization section 25 and the symbol decision section 26. The accuracy of the subcarrier signals can be improved through employment of a plurality of inter-carrier interference removal sections 40 connected in a plurality of stages. FIG. 13 shows a configuration of n inter-carrier interference removal sections 40-1 to 40-$n$ constructed at n stages. The inter-carrier interference removal sections 40-1 to 40-$n$ comprise the inter-carrier interference estimation section 41-1 to 41-$n$ and the subtractor 42-1 to 42-$n$. Respectively, as same as in FIG. 11. The inter-carrier interference removal section 40-1 at the first stage operates as described above. The inter-carrier interference removal section 40-$i$ ($2 \leq i \leq n$) at the second stage or subsequent stages decides each symbol tentatively on the basis of the corresponding subcarrier signals output from the inter-carrier interference removal section 40-(i-1) at the previous stage and having improved accuracy, calculates inter-carrier interference, and subtracts the thus-obtained inter-carrier interference from the signals of the subcarriers separated by means of the matched filters, which are output signals of the matched filter section 33. The resultant signals are fed to the inter-carrier interference removal section 40-(i+1) at the next stage or the propagation channel characteristic equalization section 25. In this manner, as the subcarrier signals pass through the inter-carrier interference removal section 40-i at each stage, inter-carrier interference is removed from the signals more precisely, thereby improving the accuracy of the subcarrier signals.

The above-described processing will be described by use of expressions. In the following description, a column vector consisting of M' complex number $x(n_q)$ and a column vector consisting of L complex number $X(k_p)$ will be simply referred to as x and X, respectively. The meanings of the matrices A and A* are the same as described above. The waveform inputted to the matched filter section 33 is expressed by x=AX, and the waveform of each subcarrier carrying L complex numbers $X(k_p)$ is represented by $\exp(2\pi j k_p n_q/N)$. The operation of the matched filter section 33 is to calculate between the waveforms of the subcarriers and the inputted waveform, and therefore, L complex numbers represented by A*x=A*AX are output. That is because the component in the pth row and the qth column of the L-by-M' matrix A* is $\exp(-2\pi j k_p n_q/N)$. The output column vector is put as $X_0$. Here, it is to be noted that all the diagonal components of the L-by-L matrix A*A are M'.

For the column vector X.sub.0, output from the matched filter section 33, as shown in FIG. 12, the propagation channel characteristic equalization section 411 and the subcarrier symbol decision section 412 at the first stage perform equalizing processing and tentative symbol decision, respectively. The propagation channel characteristic equalization section divides the signal of each subcarrier by a propagation channel characteristic coefficient corresponding to the subcarrier. Subsequently, the subcarrier symbol decision section performs tentative symbol decision. Subsequently, as shown in FIG. 12, the propagation channel characteristic reproduction section 413 multiplies the result of tentative symbol decision for each subcarrier by the propagation channel characteristic coefficient corresponding to the subcarrier. The column vector obtained as a result of the multiplication is represented by X.sub.1. Next, the inter-carrier interference component computation section 414 calculates inter-carrier interference. The calculation is to obtain A*AX.sub.1-MX.sub.1=(A*A-M'E)X.sub.1. Notably, E is an unit matrix of L by L; and L is the same integer as in the cases described previously. The subtractor 42 subtracts the thus-obtained inter-carrier interference from the signals X.sub.0of the subcarriers separated by means of the matched filter section 33 in order to obtain subcarrier signals (A*A-M'E) (X-X.sub.1)+M'X, which have higher accuracy as compared with the signals X.sub.0. When a multi-stage configuration is employed, the inter-carrier interference removal section operates as follows. As shown in FIG. 13, inter-carrier interference removal section 40 at the second stage performs equalization processing, tentative symbol decisions and reproduction process to the output (A*A-M'E) (X-X.sub.1)+M'X of the inter-carrier interference removal section 40 at the first stage so as to obtain a column vector X.sub.2 and outputs (A*A-M'E)(X-X.sub.2)+M'X after inter-carrier interference component computation. The same processing is performed in the subsequent stages, and the inter-carrier interference removal section 40-n at the nth stage outputs (A*A-M'E) (X-X.sub.n)+M'X. As compared to the column vector X.sub.0, the column vectors X.sub.1, X.sub.2, ..., X.sub.n become closer to the column vector consisting of L complex numbers X(k.sub.p), and the degree of closeness increases progressively. From the output (A*A-M'E) (X-X.sub.n)+M'X of the inter-carrier interference removal section 40 at the final stage, the propagation channel characteristic equalization section 25 and the symbol decision section 26 obtain more accurate L complex numbers.

Figure 14:
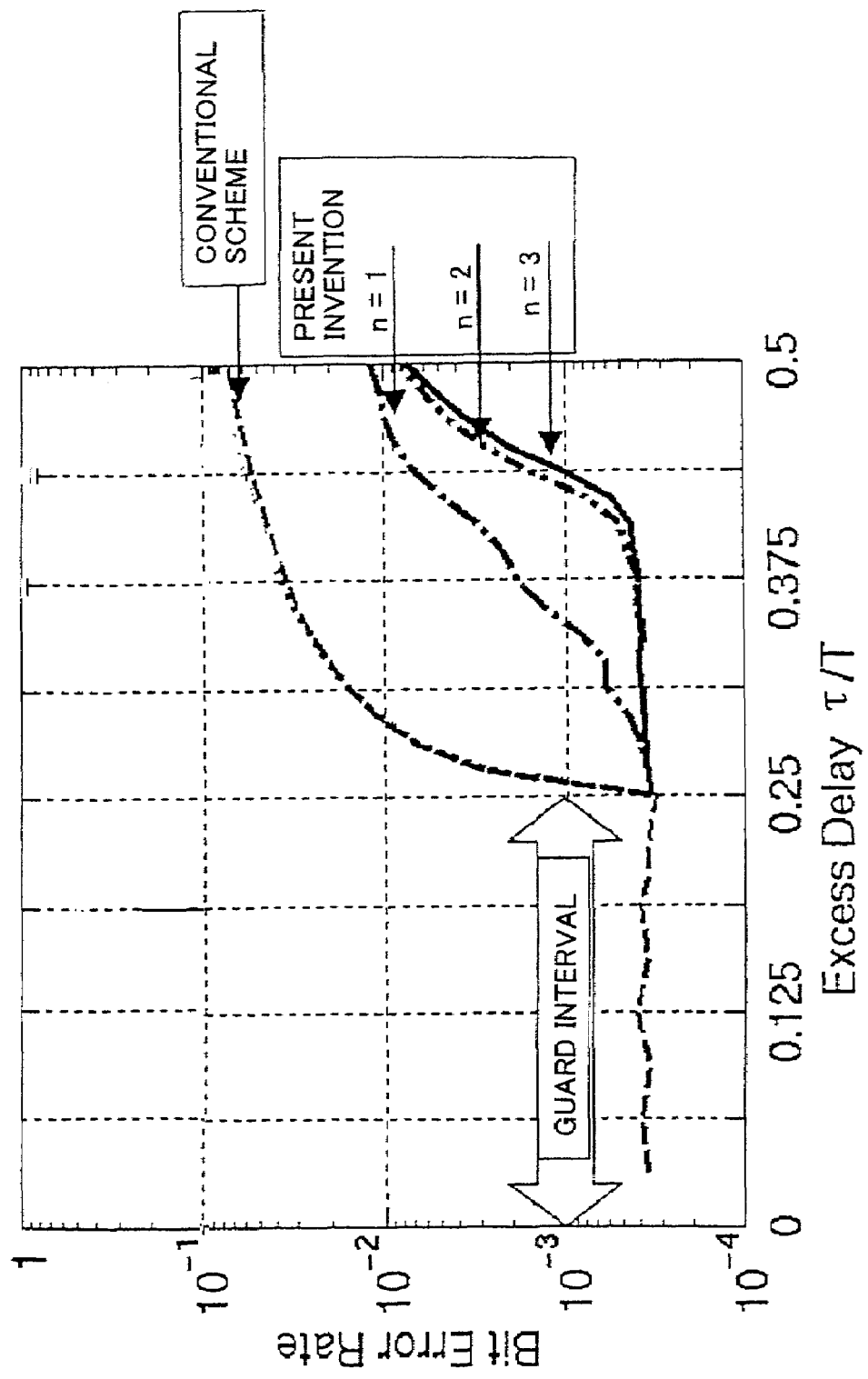
FIG. 14 is a graph showing the relation between delayed waves and error rate of the multicarrier demodulation apparatus 200 as obtained through simulation.

FIG. 14 shows results of simulation of the multicarrier demodulation apparatus 200 for the case in which n=1, 2, or 3. The simulation was performed under the same conditions as those employed in FIG. 10 for the multicarrier demodulation apparatus 100. The present invention can realize a demodulation apparatus whose error rate does not increase greatly irrespective of arrival of a delayed wave having an excess delay about T/4 greater than the guard interval (total length: T/2).

Tenth Embodiment

Figure 15:
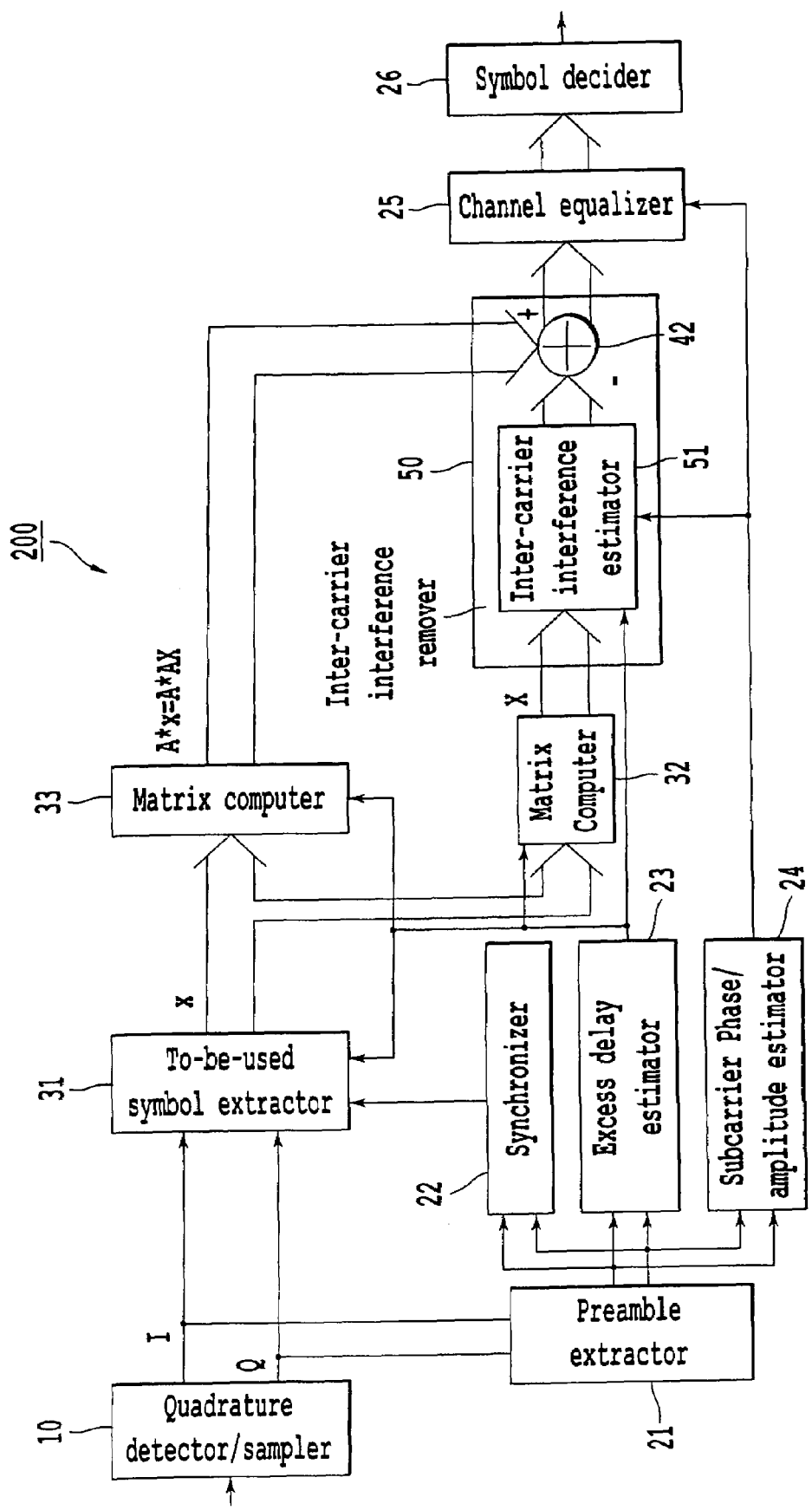
FIG. 15 is a block diagram showing the configuration of a multicarrier demodulation apparatus 300 according to a tenth embodiment of the present application.

The present embodiment is a combination of the eighth embodiment and the ninth embodiment. A multicarrier demodulation apparatus 300 shown in FIG. 15 is obtained by incorporating the matrix computation and linear operation section 32 of the eighth embodiment into the multicarrier demodulation apparatus 200 of the ninth embodiment and providing an inter-carrier-interference removal section 50 for removing inter-carrier interference by use of the output of the matrix computation and linear computation section 32 and the output of the matched filter section 33. The matrix computation and linear computation section 32 of the multicarrier demodulation apparatus 300 operates in the same manner as in the eighth embodiment. The inter-carrier-interference removal section 50 of the multicarrier demodulation apparatus 300 is the same as the inter-carrier-interference removal section 40 of the multicarrier demodulation apparatus 200 of the ninth embodiment, excepting that in place of the inter-carrier-interference estimation section 41, which constitutes the inter-carrier-interference removal section 40 of the multicarrier demodulation apparatus 200 of the ninth embodiment, an inter-carrier-interference estimation section 51 is provided and uses, as an input, $X(k_p)$, which is the output of the matrix computation and linear operation section 32.

In the eighth, ninth, and tenth embodiments, a difference in excess delay between the earliest arrival wave and the latest delayed wave is considered, and synchronization is established upon arrival of the earliest arrival wave. However, the excess delay estimation section may be modified to output the following excess delays to each section. That is, an excess delay decided in consideration of the strength of each delayed wave, and an excess delay between the earliest arrival wave and the latest delayed wave among wave shaving power greater than a predetermined threshold.

In the eighth and ninth embodiments, a period between the beginning of the guard interval of a delayed wave and the end of the effective symbol of the earliest arrival wave is used as a to-be-used symbol part. However, the to-be-used symbol part may be decided freely, so long as the decided part is located within the above-described period and the number of sampling points is not less than L, the number of subcarriers which are not null.

In the eighth and tenth embodiments, the matrix computation and linear computation section 32 is provided, and a necessary matrix $(A*A)^{-1}A*$ is obtained after estimation of the excess delay; and in the ninth embodiments, the matched filter 33 is provided, and a necessary matrix A* is obtained after estimation of the excess delay. However, these embodiments may be modified in such a manner that a matrix $(A*A)^{-1}A*$ or A* obtained on the basis of a previously assumed excess delay is stored in memory and is retrieved. When a plurality of matrices $(A*A)^{-1}A*$ or A are prepared, the demodulation apparatus can cope with various excess delays, thereby reducing the quantity of calculation during actual operation.

Obviously, numerous modifications and variations of the present invention are possible in light of the above teachings. It is therefore to be understood that within the scope of the appended claims, the present invention may be practiced otherwise than as specifically described herein.

What is claimed is:

1. A multicarrier demodulation method for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for demodulating the received signal to respective subcarriers, the method comprising:

a step of estimating an excess delay of a delayed wave, and deciding a part of the symbol regarded as a to-be-used symbol part, on the basis of the estimated excess delay, where a length of the decided part of the symbol is TM/N (M<N) within the effective symbol length T and the part of the symbol is decided so as not to contain a part of the symbol suffering from a waveform distortion caused by the delayed wave;

a step of decomposing a complex digital signal which is quadrature-detected at sampling intervals T/N into L subcarriers by use of M samples of the signal within the to-be-used symbol part by means of a matched filter; and one or a plurality of interference component removal steps of deciding L symbols tentatively from signals of the L subcarriers, obtaining interference components by use of the L tentative symbol decisions, that are contained in each of the signals of the L subcarriers separated by means of the matched filter and caused by other subcarriers, and subtracting the obtained interference components contained in each of the signals of the L subcarriers from the signals of the L subcarriers separated by means of the matched filter, to thereby obtain more reliable signals of the L subcarriers.

2. A multicarrier demodulation method for receiving a multicarrier modulated signal which consists of N subcarriers containing N-L (L<N) nullcarriers as subcarriers and in which an effective symbol has a length T, a guard interval preceding the effective symbol has a length $T_{GI}$, and a frequency interval between two adjacent subcarriers of the N subcarriers is 1/T, and for demodulating the received signal to respective subcarriers, the method comprising:

a step of estimating an excess delay of a delayed wave, and deciding a part of the symbol regarded as a to-be-used symbol part, on the basis of the estimated excess delay, where a length of the decided part of the symbol is TM'/N (M'<N+($NT_{GI}$/T)) within the total symbol length $T+T_{GI}$ of the effective symbol length and the guard interval length and the part of the symbol is decided so as not to contain a part of the symbol suffering from a waveform distortion caused by the delayed wave;

a step of decomposing a complex digital signal which is quadrature-detected at sampling intervals T/N into L subcarriers by use of M' samples of the signal within the to-be-used symbol part by means of a matched filter; and one or a plurality of interference component removal steps of deciding L symbols tentatively from signals of the L subcarriers, obtaining interference components by use of the L tentative symbol decisions, that are contained in each of the signals of the L subcarriers separated by means of the matched filter and caused by other subcarriers, and subtracting the obtained interference components contained in each of the signals of the L subcarriers from the signals of the L subcarriers separated by means of the matched filter, to thereby obtain more reliable signals of the L subcarriers.

3. A multicarrier demodulation apparatus for receiving a multicarrier modulated signal which consists of N subcarriers containing N-L (L<N) nullcarriers as subcarriers and in which an effective symbol has a length T, and a frequency interval between two adjacent subcarriers of the N subcarriers is 1/T, and for demodulating the received signal to respective subcarriers, the apparatus comprising:

a quadrature detection and sampling section for obtaining N samples of a complex digital signal quadrature-detected at sampling intervals T/N;

an excess delay estimation section for estimating an excess delay of a delayed wave;

a to-be-used symbol extraction section for extracting, on the basis of the excess delay estimated by the excess delay estimation section, M (M<N) samples of the complex digital signal as a to-be-used symbol from the N samples of the complex digital signal so as not to contain a part of the symbol suffering from a waveform distortion caused by the delayed wave;

a matched filter section for separating L subcarriers by means of a matched filter and by use of the M samples of the complex digital signal output from the to-be-used symbol extraction section; and one or a plurality of interference component removal sections each including a tentative symbol decision unit for deciding L symbols tentatively from signals of the L subcarriers, an interference component estimation unit for obtaining interference components by use of the L tentative symbol decisions, that are contained in each of the signals of the L subcarriers separated by means of the matched filter section and caused by other subcarriers, and an interference component subtractor for subtracting the obtained interference components contained in each of the signals of the L subcarriers from the signals of the L subcarriers output from the matched filter section.

4. A multicarrier demodulation apparatus for receiving a multicarrier modulated signal which consists of N subcarriers containing N-L (L<N) nullcarriers as subcarriers and in which an effective symbol has a length T, a guard interval preceding the effective symbol has a length $T_{GI}$, and a frequency interval between two adjacent subcarriers of the N subcarriers is 1/T, and for demodulating the received signal to respective subcarriers, the apparatus comprising:

a quadrature detection and sampling section for obtaining N+($NT_{GI}$/T) samples of a complex digital signal quadrature-detected at sampling intervals T/N;

an excess delay estimation section for estimating an excess delay of a delayed wave;

a to-be-used symbol extraction section for extracting, on the basis of the excess delay estimated by the excess delay estimation section, $M'(M'<N+(NT_{GI}/T))$ samples of complex digital signals as a to-be-used symbol from the $N+(NT_{GI}/T)$ samples of the complex digital signal so as not to contain a part of the symbol suffering from a waveform distortion caused by the delayed wave;

a matched filter section for separating L subcarriers by means of a matched filter and by use of the M' samples of the complex digital signal output from the to-be-used symbol extraction section; and one or a plurality of interference component removal sections each including a tentative symbol decision unit for deciding L symbols tentatively from signals of the L subcarriers, an interference component estimation unit for obtaining interference components by use of the L tentative symbol decisions, that are contained in each of the signals of the L subcarriers separated by means of the matched filter section and caused by other subcarriers, and an interference component subtractor for subtracting the obtained interference components contained in each of the signals of the L subcarriers from the signals of the L subcarriers output from the matched filter section.

* * * * *